United States Patent
Takahashi et al.

(10) Patent No.: US 10,862,403 B2
(45) Date of Patent: Dec. 8, 2020

(54) POWER CONVERSION APPARATUS

(71) Applicant: DENSO CORPORATION, Kariya (JP)

(72) Inventors: Masaya Takahashi, Kariya (JP);
Nobuhisa Yamaguchi, Kariya (JP);
Masaki Kanesaki, Kariya (JP); Shoichi Takemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/745,918

(22) Filed: Jan. 17, 2020

(65) Prior Publication Data

US 2020/0153342 A1 May 14, 2020

Related U.S. Application Data

(63) Continuation of application No. PCT/JP2018/026804, filed on Jul. 18, 2018.

(30) Foreign Application Priority Data

Jul. 20, 2017 (JP) ............................ JP2017-140673

(51) Int. Cl.
*H02M 7/538* (2007.01)
*H02M 1/15* (2006.01)
*H02M 1/00* (2006.01)

(52) U.S. Cl.
CPC ......... *H02M 7/53806* (2013.01); *H02M 1/15* (2013.01); *H02M 2001/0022* (2013.01)

(58) Field of Classification Search
CPC ............... H02M 7/53806; H02M 1/15; H02M 2001/0022; H02M 1/14; H02M 3/33732; H02M 3/3378; H02M 7/538; H02M 7/5381
See application file for complete search history.

(56) References Cited

U.S. PATENT DOCUMENTS

| 8,542,467 | B2* | 9/2013 | Yamaguchi | ......... H02M 7/5387 361/18 |
| 9,774,263 | B1* | 9/2017 | Chen | ................... H02M 3/3372 |
| 2005/0047175 | A1* | 3/2005 | Kawasaki | ......... H02M 3/33569 363/16 |

(Continued)

FOREIGN PATENT DOCUMENTS

| JP | 2001-251854 | 9/2001 |
| JP | 2017-060294 | 3/2017 |

*Primary Examiner* — Fred E Finch, III
*Assistant Examiner* — Rafael O De Leon Domenech
(74) *Attorney, Agent, or Firm* — Nixon & Vanderhye P.C.

(57) ABSTRACT

A power inversion apparatus includes a smoothing capacitor, first and second primary coils, a secondary coil, first to fourth switches of bridge circuit switches, a clamp capacitor, and a switch controller. The switch controller calculates a lower-arm duty ratio of each of the first and second switches using a map or a mathematical expression by feed-forward control based on an input voltage. The switch controller outputs a fixed value that is equal to or greater than a maximum value of the lower-arm duty ratio within a variation range of the input voltage as an upper-arm duty ratio of each of the third and fourth switches. The switch controller generates a pulse width modulation signal based on the calculated lower-arm duty ratio and the fixed value of the upper-arm duty ratio, and outputs the pulse width modulation signal to the bridge circuit switches.

13 Claims, 25 Drawing Sheets

(56) References Cited

U.S. PATENT DOCUMENTS

| | | | | |
|---|---|---|---|---|
| 2008/0084714 | A1* | 4/2008 | Kawasaki | H02M 3/33576 363/21.01 |
| 2011/0261589 | A1* | 10/2011 | Goto | H02M 3/33592 363/15 |
| 2013/0027978 | A1* | 1/2013 | Suzuki | H02M 3/33507 363/15 |
| 2017/0025962 | A1* | 1/2017 | Davidson | H02M 1/4208 |

* cited by examiner

COMPARISON EXAMPLE

COMPARISON EXAMPLE

POWER CONVERSION APPARATUS

CROSS-REFERENCE TO RELATED APPLICATIONS

The present application is a continuation application of International Application No. PCT/JP2018/026804, filed Jul. 18, 2018, which claims priority to Japanese Patent Application No. 2017-140673, filed Jul. 20, 2017. The contents of these applications are incorporated herein by reference in their entirety.

BACKGROUND

Technical Field

The present disclosure relates to a power conversion apparatus.

Related Art

A power conversion apparatus that converts electric power is known. In the power conversion apparatus, the electric power is supplied to a primary side of a transformer by a switching operation. The converted electric power is supplied to a secondary side to which a load is connected.

SUMMARY

The present disclosure provides a power inversion apparatus includes a smoothing capacitor, a first primary coil and a second primary coil, a secondary coil, first to fourth switches of bridge circuit switches, a clamp capacitor, and a switch controller. The switch controller calculates a lower-arm duty ratio that is a duty ratio of each of the first switch and the second switch using a map or a mathematical expression by feed-forward control based on an input voltage. The switch controller outputs a fixed value that is equal to or greater than a maximum value of the lower-arm duty ratio within a variation range of the input voltage as an upper-arm duty ratio that is a duty ratio of each of the third switch and the fourth switch. The switch controller generates a pulse width modulation signal based on the calculated lower-arm duty ratio and the fixed value of the upper-arm duty ratio, and outputs the pulse width modulation signal to the bridge circuit switches.

BRIEF DESCRIPTION OF THE DRAWINGS

In the accompanying drawings.

DESCRIPTION OF THE EMBODIMENTS

For example, in a high-voltage generation apparatus that is described in JP-A-2001-251854, a dust-collecting electrode of an electrostatic air cleaner is connected to the secondary side of a transformer for high-voltage generation. The apparatus detects a current that flows to switching elements (hereafter, switches) that are connected to the primary side of the transformer for high-voltage generation and feeds back the detected current to a control circuit. The control circuit controls a duty ratio of the switches based on a fed-back value of the electrical current. Dust collection performance of the electrostatic air cleaner is thereby kept constant.

When input voltage suddenly changes as a result of an operation state or the like, the current on the transformer primary side is required to be promptly compensated and output on the transformer secondary side is required to be stabilized. However, in the conventional technology in JP-A-2001-251854, because feedback control of the switch current is performed for the sudden change in the input voltage, response is delayed. As a result of the delay in response, overshooting or undershooting of output power, or overcurrent relative to a command value occurs.

In addition, conventionally, a resonant inverter that uses a push-pull circuit is known. A typical conventional push-pull circuit includes a smoothing capacitor and two switches. As a result of the two switches being alternately operated, a transformer primary-side current that flows through first and second primary coils connected to a shared center tap is controlled. A capacitive load is connected to a secondary coil of the transformer. An output current that flows to the load resonates due to an LC component of a secondary circuit. In a resonant inverter such as this, the current that is supplied to the first and second primary coils is primarily taken from the smoothing capacitor. Therefore, the burden placed on the smoothing capacitor is large and ripple current tends to increase.

Figure 1:
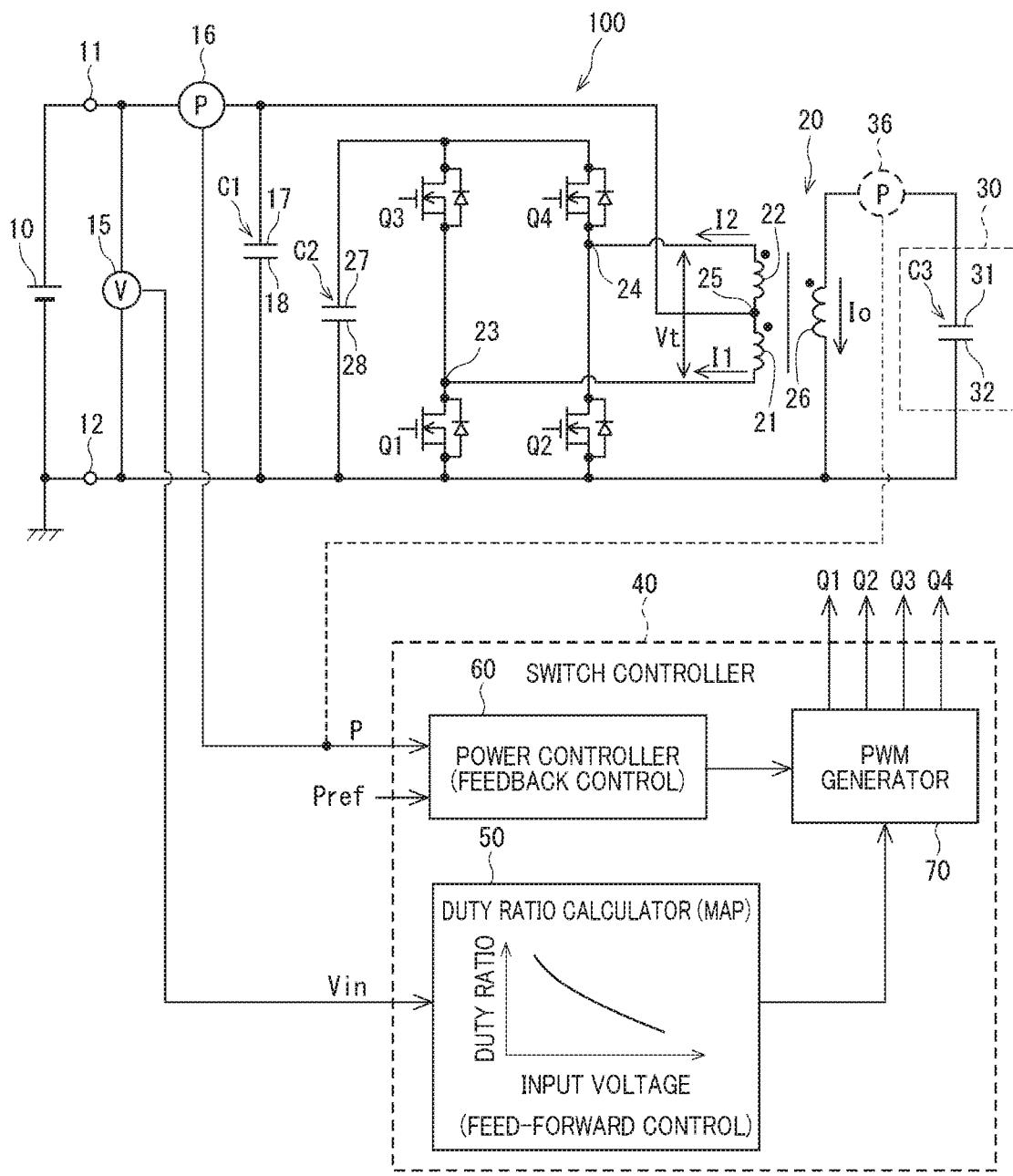
FIG. 1 is a configuration diagram of a power conversion apparatus that uses an active-clamp push-pull circuit.

In this regard, use of an active-clamp push-pull circuit can be considered. As shown in FIG. 1, the active-clamp push-pull circuit includes two lower arm switches Q1 and Q2, two upper arm switches Q3 and Q4, and a clamp capacitor C2. Source terminals of the upper arm switches Q3 and Q4 and drain terminals of the lower arm switches Q1 and Q2 are respectively connected to switch-side end portions 23 and 24 of a first primary coil 21 and a second primary coil 22. The clamp capacitor C2 is connected between drain terminals of the upper arm switches Q3 and Q4 and a low-potential input terminal 12.

In the active-clamp push-pull circuit, an operation having a period in which the lower arm switch Q1 and the upper arm switch Q4 are simultaneously turned on and an operation having a period in which the lower arm switch Q2 and the upper arm switch Q3 are simultaneously turned on are alternately repeated. In this operation, the clamp capacitor C2 supports discharge of the smoothing capacitor C1. Consequently, the burden placed on the smoothing capacitor C1 can be reduced and ripple current can be reduced.

Here, in light of the issues regarding feedback control in JP-A-2001-251854, a configuration in which feed-forward control of the duty ratio of the lower arm switches Q1 and Q2 is performed based on the input voltage is used. In this case, when the duty ratio of the upper arm switches Q3 and Q4 is changed so as to track the duty ratio of the lower arm switches Q1 and Q2, a discontinuous mode of the output current may occur. In particular, in a configuration in which switching frequency is changed based on the output power, a plurality of maps are required based on the frequencies because the duty ratio is dependent on the switching frequency in feed-forward control.

It is thus desired to provide a resonant inverter-type power conversion apparatus that uses an active-clamp push-pull circuit, in which the power conversion apparatus suppresses output variations and overcurrent caused by sudden changes in input voltage, reduces ripple current, and prevents occurrence of a discontinuous mode of electrical current.

An exemplary embodiment of the present disclosure provides a power conversion apparatus that includes a smoothing capacitor, a first primary coil, a second primary coil, a secondary coil, first to fourth switches, a clamp capacitor, and a switch controller.

The smoothing capacitor is connected between a high-potential input terminal and a low-potential input terminal to which input voltage of a direct-current power supply is applied. The first primary coil and the second primary coil configure a primary side of a transformer. One of the ends of the first primary coil and one of the ends of the second primary coil are connected to a shared center tap that is connected to the high-potential input terminal. The secondary coil configures a secondary side of the transformer and is connected to a load.

The first switch and the second switch configure a lower arm of a bridge circuit and are alternately operated, at a predetermined switching cycle. Each of the first switch and the second switch has a high-potential side terminal and a low-potential side terminal. In the first switch, the high-potential side terminal is connected to a switch-side end portion that is an end portion of the first primary coil on a side opposite to the center tap, and the low-potential side terminal is connected to the low-potential input terminal. In the second switch, the high-potential side terminal is connected to a switch-side end portion that is an end portion of the second primary coil on a side opposite to the center tap, and the low-potential side terminal is connected to the low-potential input terminal.

The third switch and the fourth switch configure an upper arm of the bridge circuit and are alternately operated at the same switching cycle as that of the first switch and the second switch. Each of the third switch and the fourth switch has terminals. One of the terminals of the third switch is connected to the switch-side end portion of the first primary coil. One of the terminals of the fourth switch is connected to the switch-side end portion of the second primary coil. The clamp capacitor is connected between the other of the terminals of the third switch and the low-potential input terminal and between the other of the terminals of the fourth switch and the low-potential input terminal.

The first switch, the second switch, the third switch, and the fourth switch configure bridge circuit switches. The switch controller calculates a duty ratio that is a ratio of an on-time of each bridge circuit switch relative to the switching cycle, and controls operation of the bridge circuit switches such that at least the fourth switch is turned on during an on-period of the first switch and the third switch is turned on during an on-period of the second switch.

The switch controller may prohibit the first switch and the second switch from being simultaneously turned on and the third switch and the fourth switch from being simultaneously turned on.

The switch controller includes a lower-arm duty ratio calculator, an upper-arm duty ratio calculator, and a pulse width modulation (PWM) generator. The lower-arm duty ratio calculator calculates a lower-arm duty ratio that is a duty ratio of the first switch and the second switch using a map or a mathematical expression by feed-forward control based on the input voltage. The upper-arm duty ratio calculator outputs a fixed value that is equal to or greater than a maximum value of the lower-arm duty ratio within a variation range of the input voltage as an upper-arm duty ratio that is a duty ratio of the third switch and the fourth switch. The PWM generator generates a PWM signal based on output from the lower-arm duty ratio calculator and output from the upper-arm duty ratio calculator, and outputs the PWM signal to the bridge circuit switches.

In the exemplary embodiment, the lower-arm duty ratio calculator calculates the lower-arm duty ratio by feed-forward control based on the input voltage. Therefore, output variations and overcurrent caused by sudden changes in the input voltage can be appropriately suppressed. In addition, instead of a typical push-pull circuit that includes only the smoothing capacitor and the lower arm switches, an active-clamp push-pull circuit that includes the clamp capacitor and the upper arm switches is used. As a result of the clamp capacitor supporting discharge by the smoothing capacitor, the burden placed on the smoothing capacitor can be reduced and ripple current can be reduced.

Furthermore, the upper-arm duty ratio is set to a fixed value that is equal to or greater than the maximum value of the lower-arm duty ratio within the variation range of the input voltage. The upper-arm duty ratio is preferably set to a maximum value that is obtained by a value that is equivalent to dead time being subtracted from 0.5, the dead time being an amount of time ensured between the on-period of the third switch and the on-period of the fourth switch. As a result, the transformer-applied voltage forms a one-pulse waveform. The occurrence of a discontinuous mode of electrical current can be prevented as much as possible. In particular, in a configuration in which switching frequency is changed based on output power, frequency dependency in feed-forward control of the duty ratio can be eliminated. Acquisition and adaptation of maps based on the switching frequencies become unnecessary.

A power conversion apparatus according to a plurality of embodiments will hereinafter be described with reference to the drawings. First and second embodiments are collectively referred to as a present embodiment. The power conversion apparatus according to the present embodiment is a resonant inverter that converts direct-current power that is supplied to a primary side of a transformer by a switching operation of a push-pull circuit and outputs alternating-current power to a secondary side to which a capacitive load is connected. In the resonant inverter, high electric power can be outputted by the switching operation of the push-pull circuit being performed at a frequency that is close to a resonance frequency of an output current.

Configuration and Operations of the Resonant Inverter

First, a configuration and operations of the resonant inverter to which the present embodiment is applied will be described with reference to FIG. 1 to FIG. 5. As shown in FIG. 1, a resonant inverter 100 includes a transformer 20 that includes two primary coils 21 and 22, and a secondary coil 26. Respective one ends of the two primary coils 21 and 22 are connected to a shared center tap 25. End portions of the first primary coil 21 and the second primary coil 22 on the sides opposite to the center tap 25 are respectively referred to as switch-side end portions 23 and 24. A high-potential input terminal 11 and a low-potential input terminal 12 of the resonant inverter 100 are connected to a positive electrode and a negative electrode of a battery 10, and an input voltage Vin of the battery 10 is applied thereto. The battery 10 serves as a direct-current power supply. For example, the low-potential input terminal 12 may be at ground potential, that is, in a grounded state. The center tap 25 of the transformer 20 is connected to the high-potential input terminal 11.

A smoothing capacitor C1, a first switch Q1, and a second switch Q2 are provided on the primary side of the transformer 20. The first switch Q1 and the second switch Q2 configure a basic push-pull circuit. The smoothing capacitor C1 is connected between the high-potential input terminal 11 and the low-potential input terminal 21, and smooths the input voltage Vin of the battery 10. The smoothing capacitor C1 has a high-potential-side electrode 17 and a low-potential-side electrode 18. The smoothing capacitor C1 has a relatively high capacitance.

In addition, as a characteristic configuration according to the present embodiment, a clamp capacitor C2, a third switch Q3, and a fourth switch Q4 are provided on the primary side of the transformer 20. In the present specification, this configuration is referred to as an active-clamp push-pull circuit. The first switch Q1 and the second switch Q2 configure a lower arm of a bridge circuit. Therefore, the first switch Q1 and the second switch Q2 are also referred to as lower arm switches Q1 and Q2. The third switch Q3 and the fourth switch Q4 configure an upper arm of the bridge circuit. Therefore, the third switch Q3 and the fourth switch Q4 are also referred to as upper arm switches Q3 and Q4. In addition, the switches of the upper and lower arms are collectively referred to as bridge circuit switches Q1 to Q4.

For example, the bridge circuit switches Q1 to Q4 are configured by metal-oxide-semiconductor field-effect transistors (MOSFETs). When a gate signal is supplied, energization occurs between a drain and a source. In addition, a body diode that allows a current that flows from the source towards the drain is added. Here, an insulated-gate bipolar transistor (IGBT) to which a freewheeling diode is connected in parallel may be used as the switch. In this case, the present disclosure may be interpreted such that the names of the terminals are replaced with collector, emitter, and the like, as appropriate.

In the first switch Q1, a drain terminal is connected to the switch-side end portion 23 of the first primary coil 21. A source terminal is connected to the low-potential input terminal 12. In the second switch Q2, the drain terminal is connected to the switch-side end portion 24 of the second primary coil 22. The source terminal is connected to the low-potential input terminal 12. The first switch Q1 and the second switch Q2 are alternately operated at a predetermined switching cycle Ts shown in FIG. 8 and the like. As a result, a first current I1 and a second current I2 that are in opposite directions of each other flow to the first primary coil 21 and the second primary oil 22. In accompaniment, an output current Io of which the direction alternates flows to the secondary side of the transformer 20.

In the third switch Q3, the source terminal is connected to the switch-side end portion 23 of the first primary coil 21 and the drain terminal of the first switch Q1. In the fourth switch Q4, the source terminal is connected to the switch-side end portion 24 of the second primary coil 22 and the drain terminal of the second switch Q2. The third switch Q3 and the fourth switch Q4 are alternately operated at the same switching cycle Ts as that of the first switch Q1 and the second switch Q2. Details of the operation will be described hereafter.

The clamp capacitor C2 is connected between the drain terminals of the third switch Q3 and the fourth switch Q4, and the low-potential input terminal 12. The clamp capacitor C2 has a high-potential-side electrode 27 and a low-potential-side electrode 28. The clamp capacitor C2 provides a function for supporting discharge performance of the smoothing capacitor C1 and reducing ripple current.

On the secondary side of the transformer, electrodes 31 and 32 of a capacitive load C3 are connected to both ends of the secondary coil 26. An end portion of the secondary coil 26 on the side that is connected to the electrode 32 is connected to the low-potential input terminal 12. As a result of an inductance component of the secondary coil 26 and a capacitance component of the load C3, resonance is generated in the output current Io that flows through the secondary circuit. When inductance is L and capacitance is C, a resonance frequency thereof is expressed by $1/(2\pi\sqrt{LC})$.

Figure 2:
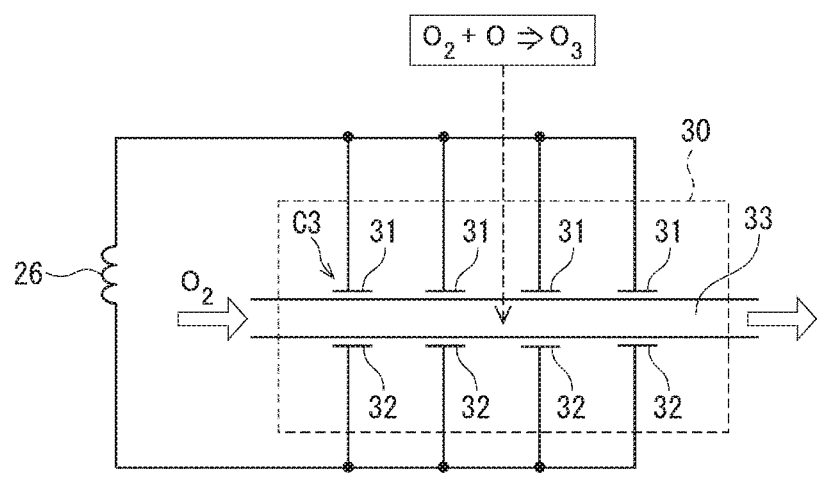
FIG. 2 is a schematic diagram of a discharge reactor used in an ozone generation apparatus.

As shown in FIG. 2, for example, the load C3 according to the present embodiment is a discharge reactor that is used in an ozone generation apparatus 30. In the discharge reactor C3, a plurality of pairs of electrodes 31 and 32 are provided along a flow path 33. When high-voltage pulse power is supplied between the electrodes 31 and 32, oxygen molecules that pass through the flow path 33 are decomposed and oxygen radicals are produced. Then, as a result of oxygen radicals (O) reacting with other oxygen molecules ($O_2$), ozone ($O_3$) is produced. For example, the ozone generation apparatus 30 is mounted of the output current in a vehicle of which an engine is a power source. The ozone generation apparatus 30 generates ozone for decomposition of unburned CH in exhaust gas. The resonant inverter 100 adjusts a production amount of ozone by controlling electric power that is outputted to the discharge reactor C3.

Returning to FIG. 1, an input voltage detector 15 is provided on the battery 10 side of the resonant inverter 100. In addition, at least either of an input power detector 16 on the primary side of the transformer 20 and an output power detector 36 on the secondary side is provided. A switch controller 40 according to the present embodiment includes a duty ratio calculator 50, a power controller 60, and a pulse width modulation (PWM) generator 70. The duty ratio calculator 50 performs feed-forward control. The power controller 60 performs feedback control. The PWM generator 70 generates a PWM signal and outputs the PWM signal to the gates of the bridge circuit switches Q1 to Q4.

Figure 6:
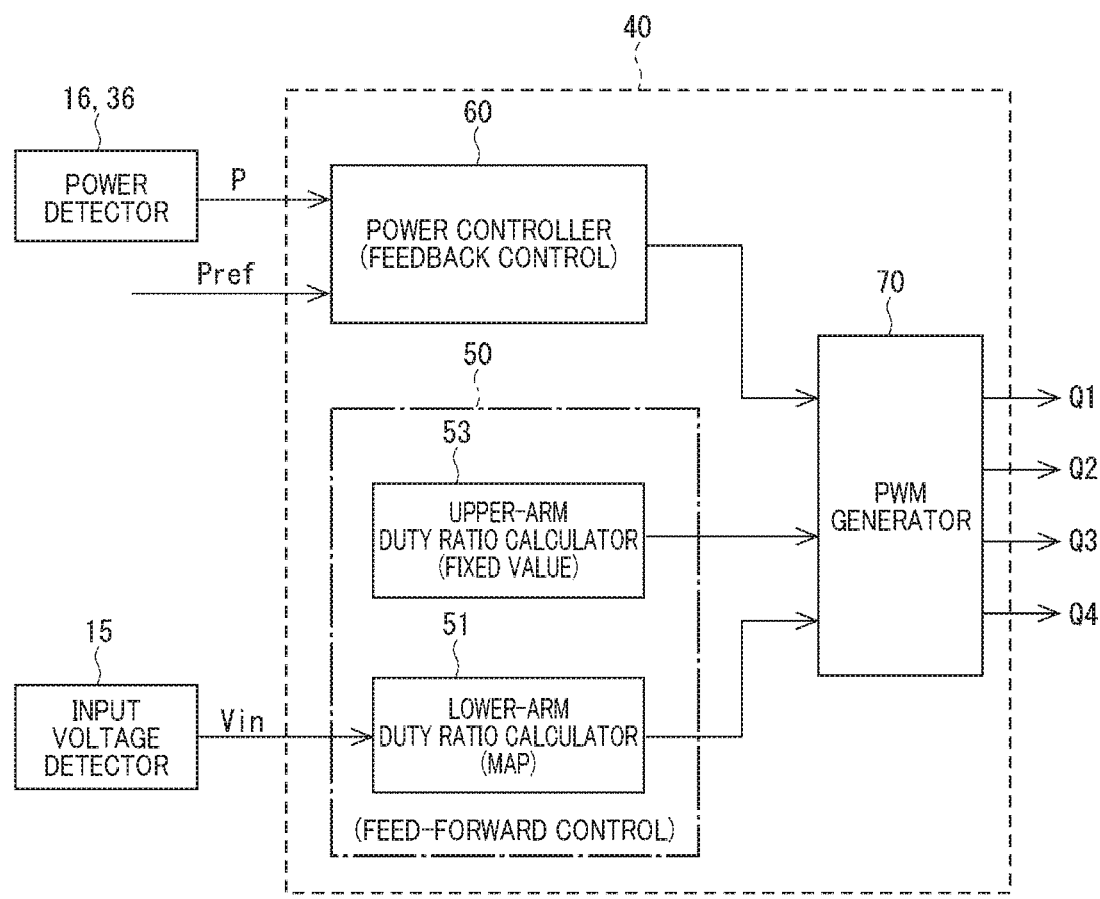
FIG. 6 is a control block diagram of a switch controller according to first and second embodiments.

The duty ratio calculator 50 calculates the duty ratio using a map or a mathematical expression by feed-forward control based on the input voltage Vin acquired from the input voltage detector 15. Here, the duty ratio is a ratio of an on-time of each of the switches Q1 to Q4 relative to the switching cycle Ts. Here, the configuration of the duty ratio calculator 50 shown in FIG. 1 is shared with a comparison example that is compared to the present embodiment. Configurations that are characteristic to the present embodiment are shown in FIG. 6, described hereafter.

The power controller 60 performs feedback control such that actual power P that is acquired from the input power detector 16 or the output power detector 36 matches target power Pref. A detailed configuration of the power controller 60 will also be described hereafter. The PWM generator 70 generates the PWM signal based on output from the duty ratio calculator 50 and the power controller 60.

Next, an overview of the operations of the active-clamp push-pull circuit will be described with reference to FIG. 3 to FIG. 5. In FIG. 1, the current that flows through the first primary coil 21 is the first current I1. The current that flows through the second primary coil 22 is the second current I2. The current that flows through the secondary coil 26 is the output current Io. Regarding the first current I1 and the second current I2, a direction from the center tap 25 towards the switch-side end portions 23 and 24 is defined as positive. Regarding the output current Io, a direction from the electrode 31 of the load C3 through the secondary coil 26 towards the electrode 32 is defined as positive.

Figure 3:
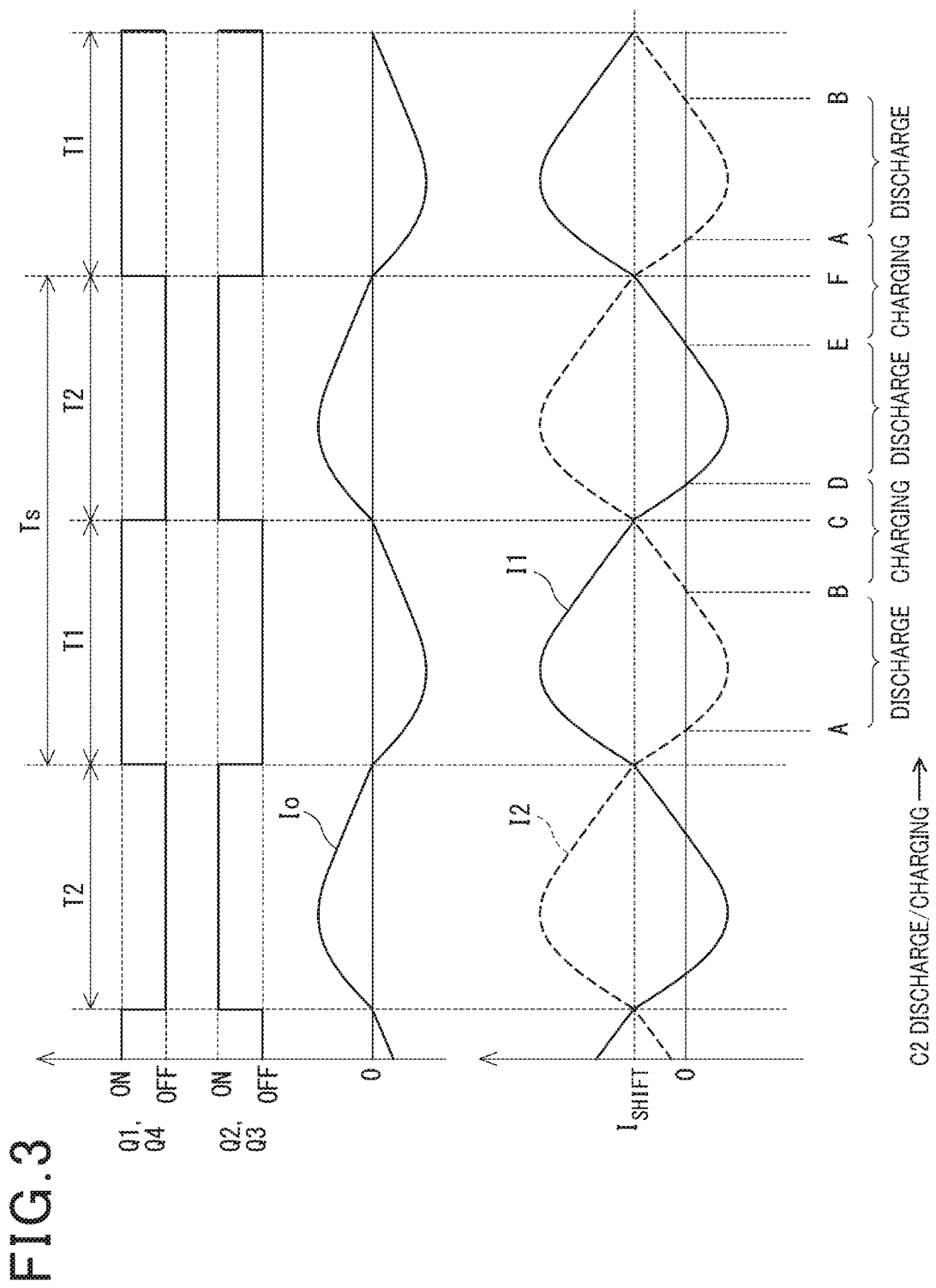
FIG. 3 is a timing chart of an example of an operation of the active-clamp push-pull circuit.

A time chart in FIG. 3 shows a relationship between the operations of the switches Q1 and Q2, and the changes in the first current I1, the second current I2, and the output current Io. Here, a first period T1 during which the first switch Q1 and the fourth switch Q4 are turned on and a second period T2 during which the second switch Q2 and the third switch Q3 are turned on are alternately switched. Dead time is ignored.

Here, in this example, the first current I1 and the second current I2 are detected. On/off of each switch is switched at a timing at which the first current I1 and the second current I2 become equal to a positive switching value ISHIFT. However, the switching timing of the switch is not limited thereto. When the second current I2 is greater than the first current I1, the output current Io is positive. When the first current I1 is greater than the second current I2, the output current Io is negative.

In the switching cycle Ts, symbols A to F are given to timings at which the first current I1 or the second current I2 crosses zero, and timings at which the first current I1 and second current I2 cross and become equal. At timings A and B during the first period T1, the second current I2 respectively crosses zero from positive to negative and from negative to positive. At timing C at which the first period T1 transitions to the second period T2, the increasing second current I2 and the decreasing first current I1 cross. At timings D and E during the second period T2, the first current I1 respectively crosses zero from positive to negative and from negative to positive. At timing F at which the second period T2 transitions to the first period T1, the increasing first current I1 and the decreasing second current I2 cross.

FIG. 4A, FIG. 4B, FIG. 5A, and FIG. 5B show paths of the first current I1 and the second current I2 at each timing. In the smoothing capacitor C1 and the clamp capacitor C2, an arrow from the low-potential electrodes 18 and 28 to the high-potential electrodes 17 and 27 indicates discharge. An arrow from the high-potential electrodes 17 and 27 to the low-potential electrodes 18 and 28 indicates charging. In addition, regarding the direction of the current that flows through the switches Q1 to Q4, a direction that flows from the drain to the source is a forward direction and a direction that flows from the source to the drain is a reverse direction.

Figure 4A:
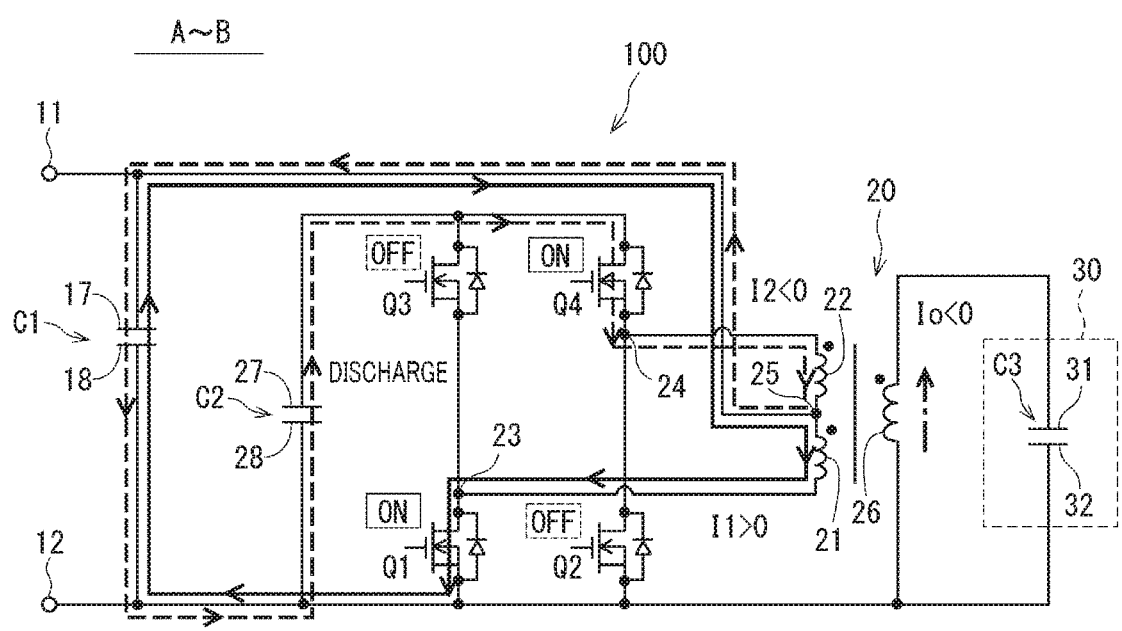
FIG. 4A is a diagram of a current path during a period of timings A to B.

During a period of timings A to B shown in FIG. 4A, the positive first current I1 is discharged from the smoothing capacitor C1, passes from the center tap 25 through the first primary coil 21, and flows through the first switch Q1 in the forward direction. The negative second current I2 is discharged from the clamp capacitor C2, flows through the fourth switch Q4 in the forward direction, passes through the second primary coil 22 and the center tap 25, and charges the smoothing capacitor C1. During this period, the first current I1 that is generated as a result of discharge by the smoothing capacitor C1 flows through the first primary coil 21. In addition, the second current I2 that is generated as a result of discharge by the clamp capacitor C2 flows through the second primary coil 22.

Figure 4B:
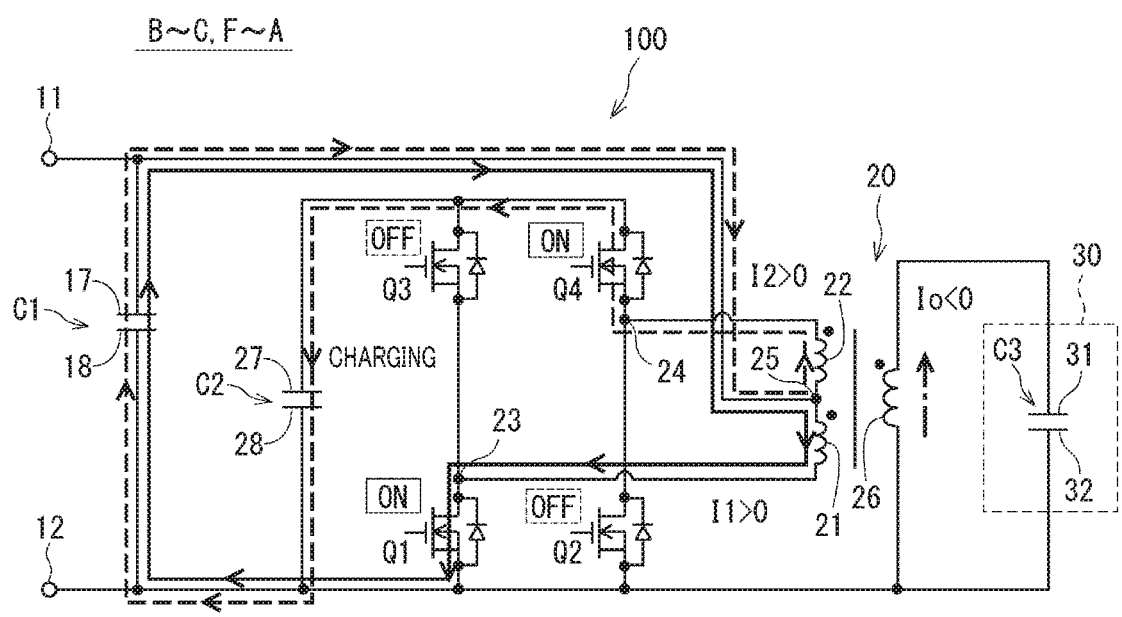
FIG. 4B is a diagram of a current path during periods of timings B to C and F to A.

During periods of timings B to C and F to A shown in FIG. 4B, the positive first current I1 flows over the same path as that in FIG. 4A in the same direction as that in FIG. 4A. The positive second current I2 flows over the same path as that in FIG. 4A in a direction that is opposite to that in FIG. 4A. That is, the second current I2 is discharged from the smoothing capacitor C1, passes from the center tap 25 through the second primary coil 11, flows through the fourth switch Q4 in the reverse direction, and charges the clamp capacitor C2.

Figure 5A:
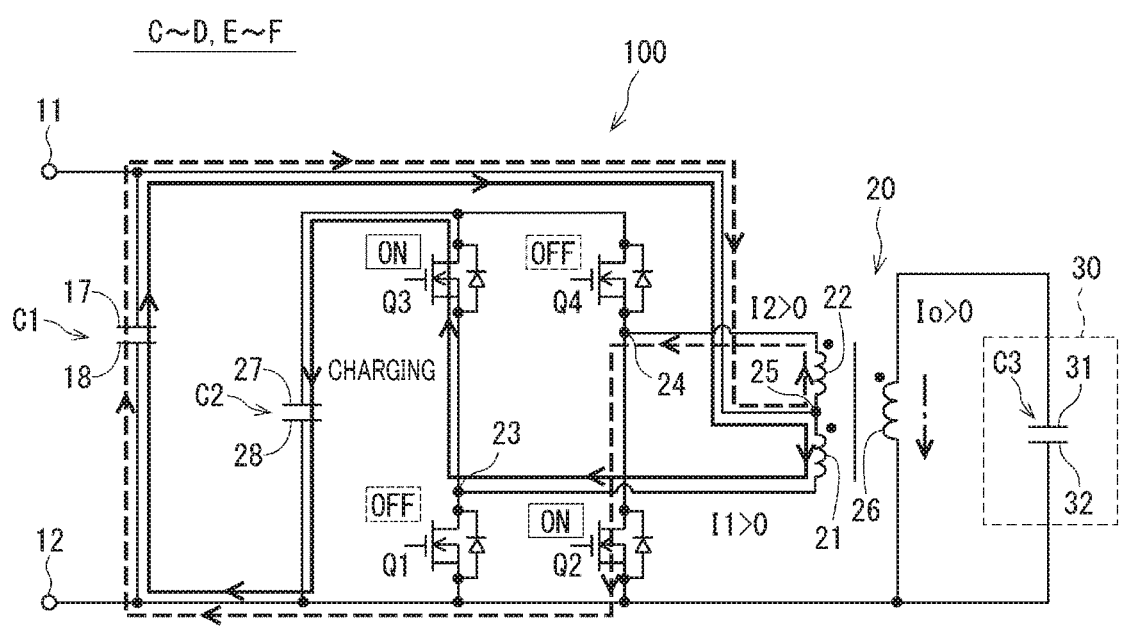
FIG. 5A is a diagram of a current path during periods of timings C to D and E to F.

During periods of timings C to D and E to F shown in FIG. 5A, the positive second current I2 is discharged from the smoothing capacitor C1, passes from the center tap 25 through the second primary coil 22, and flows through the second switch Q2 in the forward direction. The positive first current I1 is discharged from the smoothing capacitor C1, passes from the center tap 25 through the first primary coil 21, flows through the third switch Q3 in the reverse direction, and charges the clamp capacitor C2.

Figure 5B:
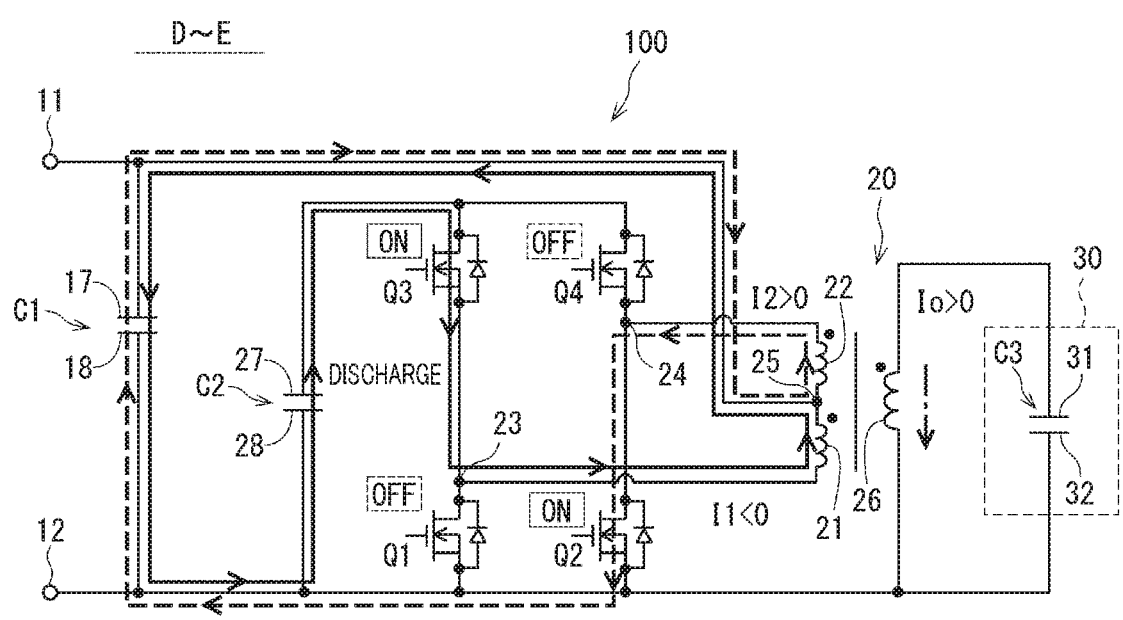
FIG. 5B is a diagram of a current path during a period of timings D to E.

During a period of timings D to E shown in FIG. 5B, the positive second current I2 flows over the same path as that in FIG. 5A in the same direction as that in FIG. 5A. The negative first current I1 flows over the same path as that in FIG. 5A in a direction that is opposite to that in FIG. 5A. That is, the negative first current I1 is discharged from the clamp capacitor C2, flows through the third switch Q3 in the forward direction, passes through the first primary coil 21 and the center tap 25, and charges the smoothing capacitor C1. During this period, the second current I2 that is generated as a result of discharge by the smoothing capacitor C1 flows through the second primary coil 22. In addition, the first current I1 that is generated as a result of discharge by the clamp capacitor C2 flows through the first primary coil 21.

In the resonant inverter that uses a typical push-pull circuit that is configured by only the smoothing capacitor C1 and the lower arm switches Q1 and Q2, the current that is supplied to the first primary coil 21 and the second primary coil 22 is primarily taken from the smoothing capacitor C1. Therefore, an issue arises in that the burden placed on the smoothing capacitor C1 is large, and ripple current tends to be large. In contrast, in the active-clamp push-pull circuit, during the periods of timings A to B and D to E, the current that is generated as a result of discharge by the smoothing capacitor C1 and the current that is generated as a result of discharge by the clamp capacitor C2 both flow through the primary coils 21 and 22. Consequently, the burden of discharge by the smoothing capacitor C1 can be reduced and ripple current can be reduced.

First Embodiment

The configuration of the switch controller 40 according to the present embodiment in the power conversion apparatus that uses the active-clamp push-pull circuit such as that described above will be described with reference to FIG. 1 and FIG. 6 to FIG. 10. FIG. 6 shows the configuration of the duty ratio calculator 50 of the switch controller 40 in more detail than that in FIG. 1. The duty ratio calculator 50 according to the present embodiment includes a lower-arm duty ratio calculator 51 and an upper-arm duty ratio calculator 53. Hereafter, the duty ratio of the first switch Q1 and the second switch Q2 that are the lower arm switches is referred to as a lower-arm duty ratio. In addition, the duty ratio of the third switch Q3 and the fourth switch Q4 that are the upper arm switches is referred to as an upper-arm duty ratio.

Figure 7:
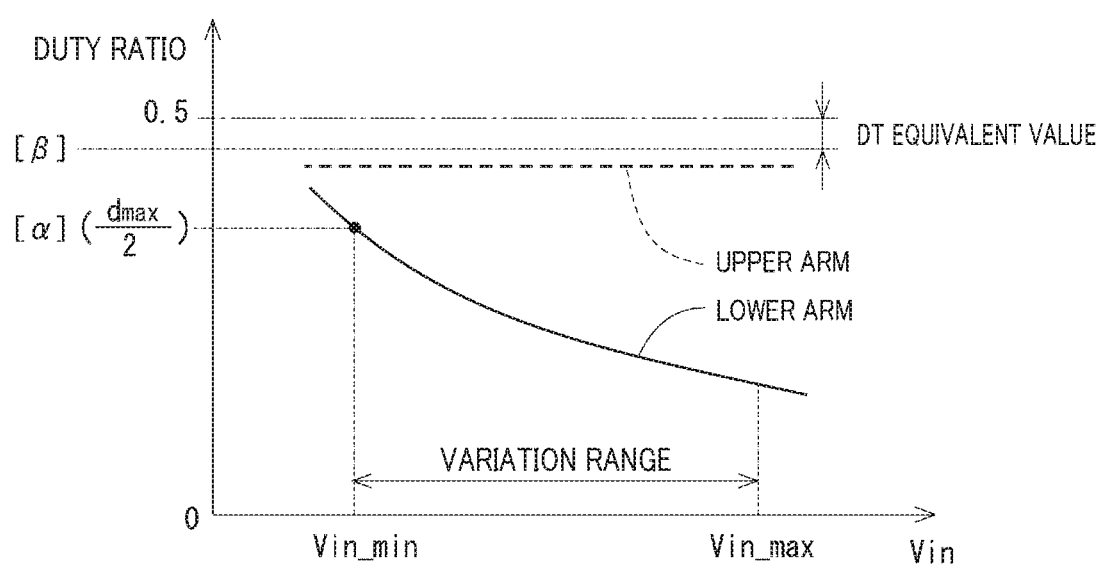
FIG. 7 is a map prescribing a relationship between input voltage and duty ratio.

The lower-arm duty ratio calculator 51 calculates the lower-arm duty ratio using a map or a mathematical expression by feed-forward control based on the input voltage Vin detected by the input voltage detector 15. FIG. 7 shows a map that prescribes a relationship between the input voltage Vin and the duty ratio in feed-forward control. This map indicates a negative correlation in which the duty ratio decreases as the input voltage Vin increases, within a variation range of the input voltage Vin. Therefore, the duty ratio at a lower-limit value Vin_min of the input voltage within the variation range is maximum, and the duty ratio at an upper-limit value Vin_max of the input voltage is minimum. Here, a maximum value of the duty ratio is denoted by [α]. Here, descriptions of (dmax/2), [β], and the like are cited in descriptions hereafter.

Figure 8:
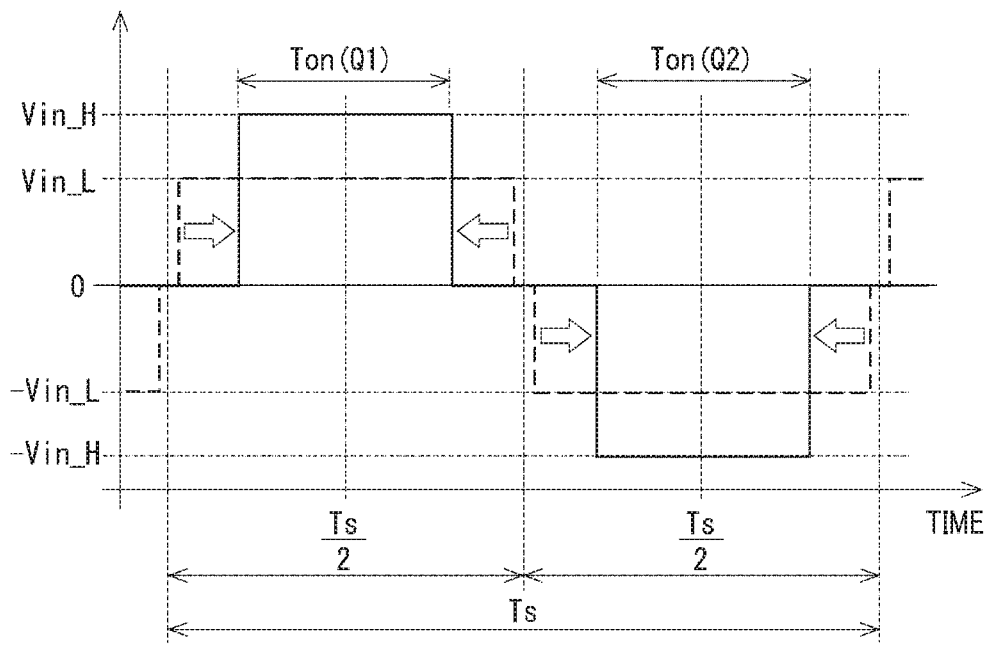
FIG. 8 is a diagram for explaining workings to maintain constant output through duty ratio control.

Operations by which output is kept constant by duty ratio control will be described with reference to FIG. 8. A relatively low voltage within the variation range of the input voltage Vin is denoted by Vin_L, and a relatively high voltage is denoted by Vin_H. For example, as the voltage of the battery 10, Vin_L is assumed to be about 10 V and Vin_H is assumed to be about 16 V. FIG. 8 shows an operation in which the first switch Q1 is turned on for a first half of the switching cycle Ts and the second switch Q2 is turned on for a latter half of the switching cycle Ts. At the low voltage Vin_L that is indicated by a broken line, on-time Ton of the switches Q1 and Q2 is close to half (Ts/2) of the switching cycle and the duty ratio is close to 0.5. From this state, when the input voltage Vin increases to the high voltage Vin_H that is indicated by a solid line, control is performed such that the on-time Ton of the switches Q1 and Q2 is short, that is, the duty ratio is small. Consequently, even when the input voltage Vin changes, output is kept constant by the duty ratio control.

Returning to FIG. 6, the upper-arm duty ratio calculator 53 outputs a fixed value as the upper-arm duty ratio. That is, the feed-forward control of the duty ratio with reference to FIG. 7 and FIG. 8 is applied only to the lower-arm duty ratio according to the present embodiment and is not reflected in the setting of the upper-arm duty ratio. In this way, according to the present embodiment, the upper-arm duty ratio is outputted as a fixed value. Specific setting of the value of the upper-arm duty ratio and working effects of this configuration will be described hereafter.

Figure 9:
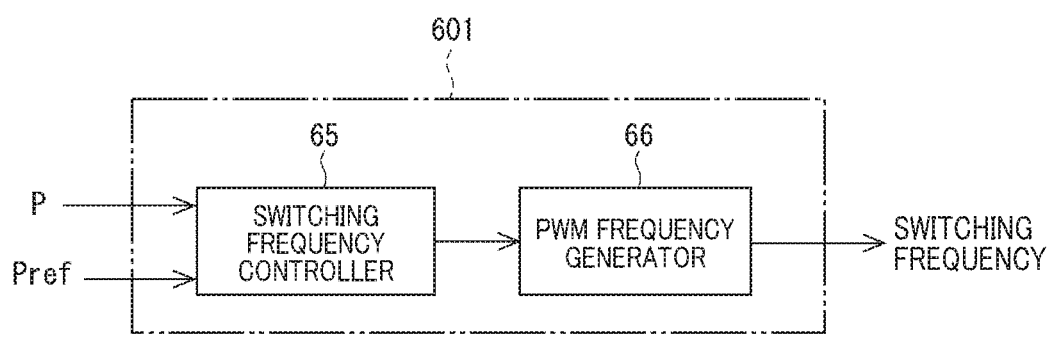
FIG. 9 is a control block diagram of a power controller according to the first embodiment.

The first embodiment and the second embodiment differ in terms of the configuration of the power controller 60. The reference numbers of the power controller 60 according to the first embodiment and the second embodiment are respectively 601 and 602. As shown in FIG. 9, the power controller 601 according to the first embodiment includes a switching frequency controller 65 and a PWM frequency generator 66. The power controller 601 performs feedback control of electric power. The switching frequency controller 65 controls switching frequency such that the detected power P matches the target power Pref. The PWM frequency generator 66 generates a PWM frequency based on control results of the switching frequency controller 65 and outputs the PWM frequency to the PWM generator 70.

Figure 10:
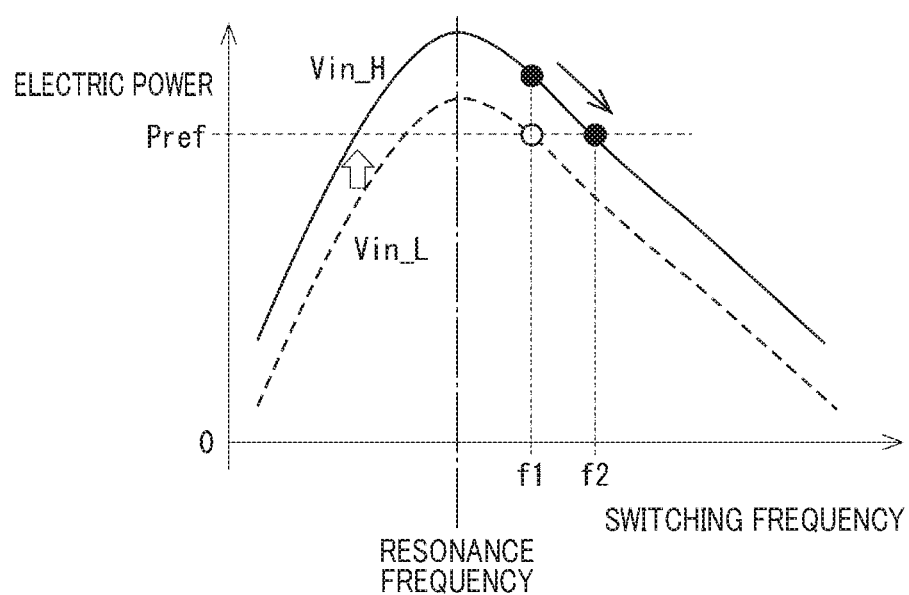
FIG. 10 is a characteristics diagram of a relationship between switching frequency and electric power.

As shown in FIG. 10, the switching frequency and the electric power have a chevron-shaped relationship in which the resonance frequency is the peak. When the input voltage Vin increases from Vin_L on the low voltage side to Vin_H on the high voltage side, the overall chevron-shaped curve shifts to the higher power side. For example, at the input voltage Vin_L, driving at a switching frequency f1 at which the target power Pref can be acquired is performed. Subsequently, when the input voltage Vin increases to the input voltage Vin_H, the electric power P corresponding to the switching frequency f1 exceeds the target power Pref. Here, the switching frequency controller 65 changes the switching frequency to f2 such that the electric power P matches the target power Pref.

Figure 18:
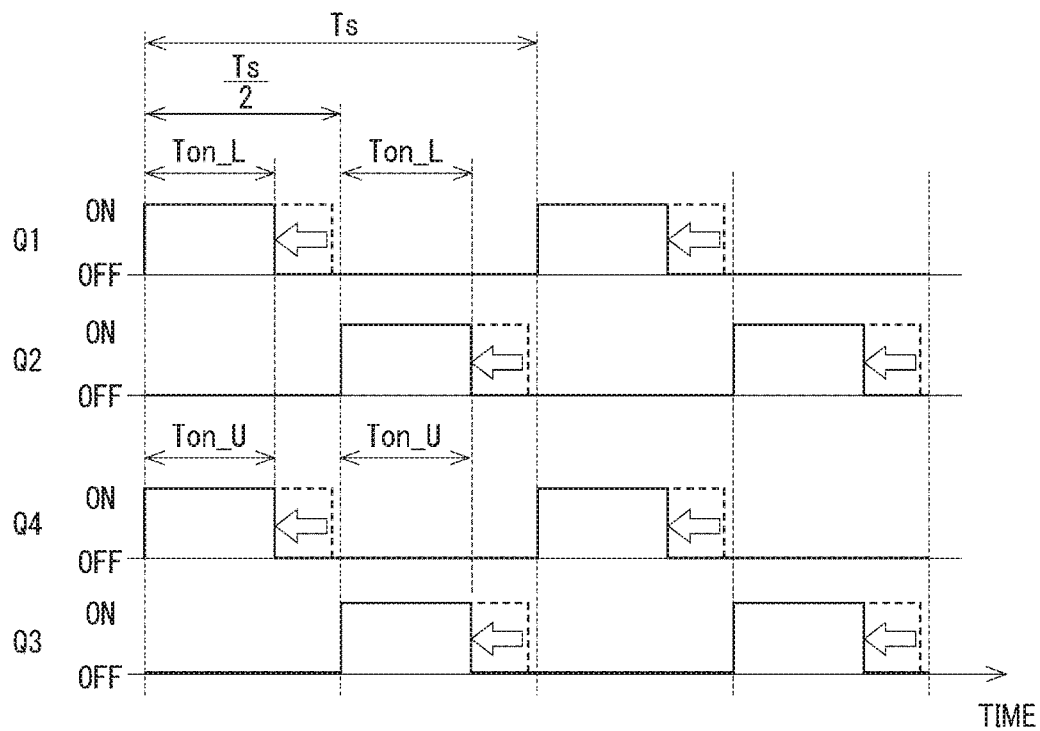
FIG. 18 is a diagram for explaining the gate driving method in a comparison example.

Next, the configuration and working effects of the switch controller 40 according to the present embodiment will be described mainly with reference to FIG. 11 to FIG. 13, in comparison to the configuration and workings of the comparison example shown in FIG. 18 to FIG. 20. The duty ratio calculator 50 in FIG. 1 is referenced as the configuration of the duty ratio calculator of the comparison example. FIG. 18 shows a driving method for the bridge circuit switches Q1 to Q4 in the comparison example. Ts is the switching cycle. Ton_L is the on-time of the lower arm switches Q1 and Q2. Ton_U is the on-time of the upper arm switches Q3 and Q4. A block arrow indicates that, when the input voltage Vin increases from a low state to a high state, the on-time of the switches Q1 to Q4 is shortened from a state indicated by broken lines to a state indicated by solid lines.

As a premise for driving that is shared between the comparison example and the present embodiment, the first switch Q1 and the second switch Q2 of the lower arm are equally operated in an alternating manner. The third switch Q3 and the fourth switch Q4 of the upper arm are equally operated in an alternating manner. In addition, for the workings of discharge support by the clamp capacitor C1 shown in FIG. 4 and FIG. 5 to be achieved, at least the fourth switch Q4 is required to be turned on during an on-period of the first switch Q1 and the third switch Q3 is required to be turned on during the on-period of the second switch Q2. Here, prohibiting the first switch Q1 and the third switch Q3, and the second switch Q2 and the fourth switch Q4 that are upper- and lower-arm pairs from being simultaneously turned on to prevent a short circuit is common technical knowledge.

Furthermore, in the active-clamp push-pull circuit, when the simultaneous-on state of the first switch Q1 and the second switch Q2, or the simultaneous-on state of the third switch Q3 and the fourth switch Q4 occurs, magnetic flux between the primary coils 21 and 22 of the transformer 20 is canceled. As a result, electric power to the secondary side is not outputted. A large current flows on the primary side. To prevent this situation, the switch controller 40 prohibits the first switch Q1 and the second switch Q2 from being simultaneously turned on, and the third switch Q3 and the fourth switch Q4 from being simultaneously turned on. Consequently, an abnormal current can be prevented from flowing to the primary side, and electric power can be appropriately outputted to the load C3 on the secondary side.

Under the above-described premise, in the comparison example, the first switch Q1 and the fourth switch Q4 are simultaneously turned on/off, and the second switch Q2 and the third switch Q3 are simultaneously turned on/off. That is, the on-time Ton_U of the upper arm switches Q3 and Q4 is set to be equal to the on-time Ton_L of the lower arm switches Q1 and Q2 at all times, regardless of the input voltage Vin. Therefore, the upper-arm duty ratio is set to be equal to the lower-arm duty ratio at all times, regardless of the input voltage Vin.

Figure 11:
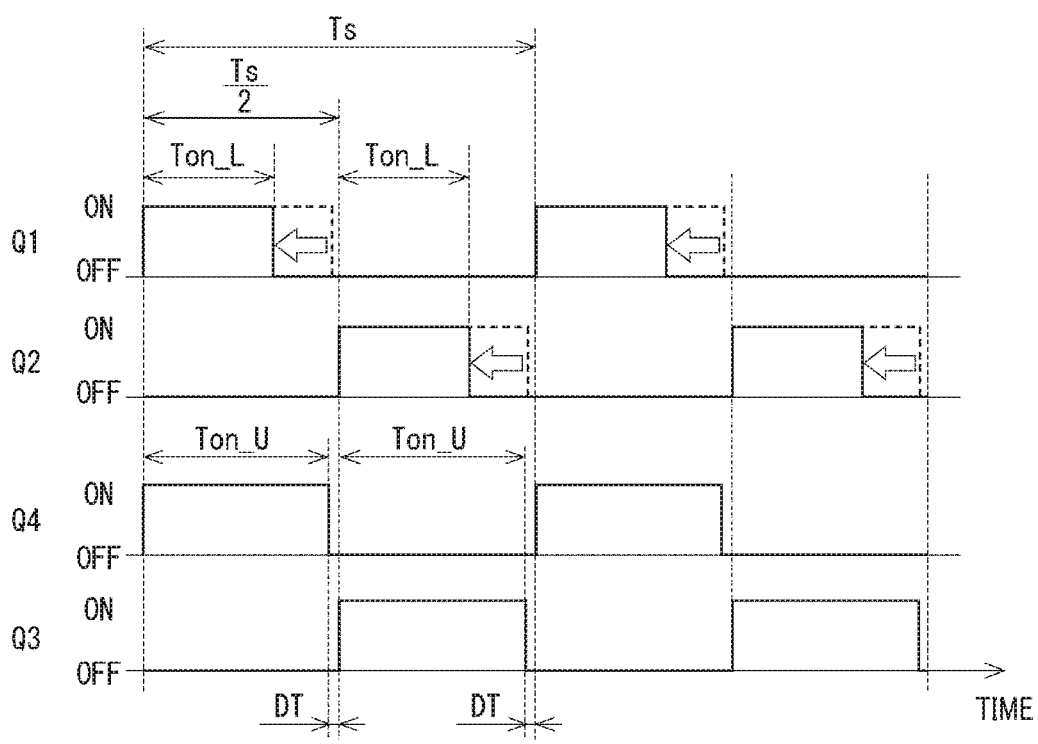
FIG. 11 is a diagram for explaining a gate driving method according to the first embodiment.

As shown in FIG. 11, according to the present embodiment, the on-time Ton_L of the lower arm switches Q1 and Q2 is shortened in a manner similar to that in the comparison example, in accompaniment with the increase in the input voltage Vin. However, the on-time Ton_U of the upper arm switches Q3 and Q4 is fixed relative to the switching cycle Ts, regardless of the changes in the input voltage Vin. That is, the upper-arm duty ratio is set to a fixed value regardless of the changes in the input voltage Vin. The fixed value of the upper-arm duty ratio is set to be equal to or greater than a maximum value of the lower-arm duty ratio, and preferably set to a value obtained by a value equivalent to dead time DT being subtracted from 0.5.

The dead time DT is ensured between the on-period of the third switch Q3 and the on-period of the fourth switch Q4. The dead time DT is a minimum amount of time required to prevent a simultaneous-on state. The dead time DT is determined based on element characteristics of the switches Q3 and Q4, and manufacturing variations. In general, an amount of time within several % of the switching cycle Ts, such as within 5%, is expected. For example, when the value equivalent to the dead time DT is 5% of the switching cycle Ts, 0.45 that is obtained by 0.05 being subtracted from 0.5 is set as the upper-arm duty ratio.

In a map in FIG. 7, the value obtained by a dead-time equivalent value being subtracted from 0.5 is denoted by [β]. According to the present embodiment, the upper-arm duty ratio is indicated as being a fixed value that is equal to or greater than the maximum duty ratio [α] corresponding to the lower-limit value Vin_min of the input voltage and equal to or less than the value [β] obtained by the dead-time equivalent value being subtracted from 0.5. Preferably, the upper-arm duty ratio is set to a value that is equal to [β] that is the maximum value within this range.

In this manner, the upper-arm duty ratio for realistic driving according to the present embodiment is the value that is obtained by the dead-time equivalent value being subtracted from 0.5. However, when the dead time is idealistically considered to be zero, the driving method according to the present embodiment can be said to be a method in which driving is performed at a full duty ratio in which either of the upper switches Q3 and Q4 is turned on at all times. Meanwhile, the driving method of the comparison example is a method in which the upper-arm duty ratio tracks the lower-arm duty ratio.

Figure 12:
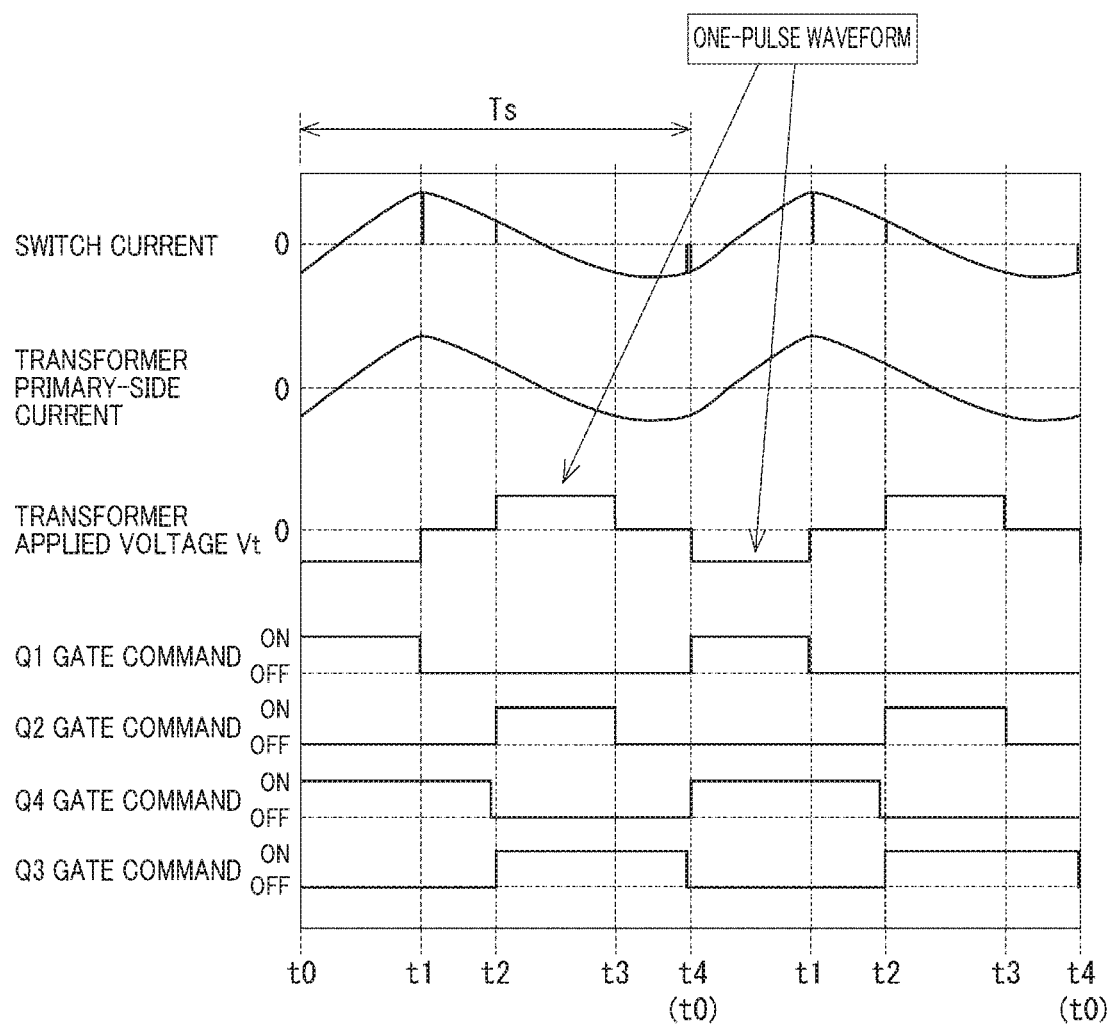
FIG. 12 is a waveform diagram of a transformer primary-side current and a transformer-applied voltage according to the first embodiment.
Figure 19:
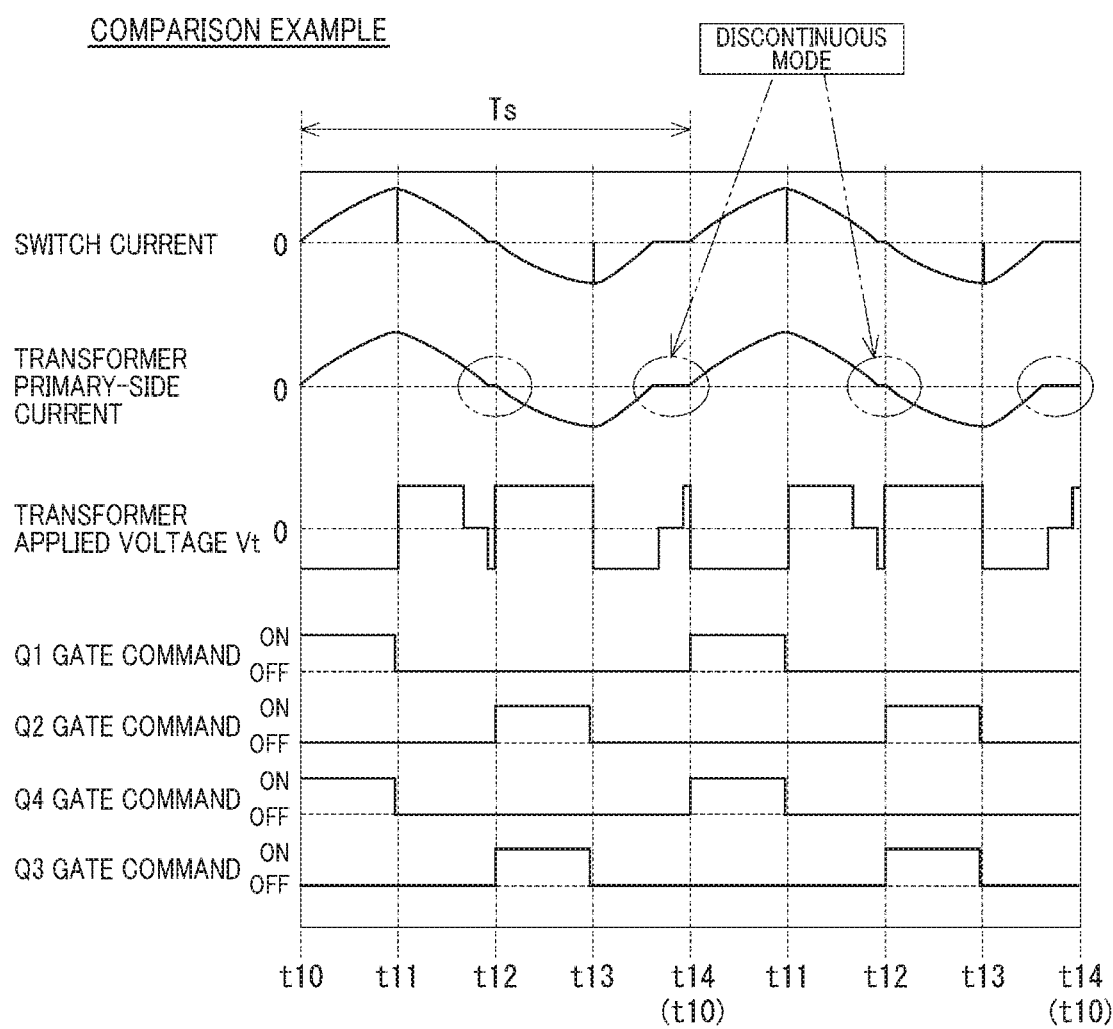
FIG. 19 is a waveform diagram of the transformer primary-side current and the transformer-applied voltage in the comparison example.

Regarding differences in drive waveform due to such differences in the driving method, refer to FIG. 19 of the comparison example and FIG. 12 according to the present embodiment. FIG. 19 and FIG. 12 show the switch current, the transformer primary-side current, the transformer-applied voltage, and the gate commands for the bridge circuit switches Q1 to Q4. Regarding the switch current, the current that flows to any of the switches Q1 to Q4 is shown in a single drawing. The switch through which the current flows is switched at a timing indicated by a vertical line. Regarding the transformer primary-side current, the switch current during periods excluding the switching timing continuously flows.

In the driving in the comparison example in FIG. 19, during a period of time t10 to t11 that corresponds to about one-fourth of the switching cycle Ts, the first switch Q1 and the fourth switch Q4 are turned on. During a period of time t12 to t13, the second switch Q2 and the third switch Q3 are turned on. During a period of time t11 to t12 and a period of time t13 to t14, all switches Q1 to Q4 are turned off. As a result of driving such as this, immediately before transition from the state in which all switches Q1 to Q4 are turned off to the state in which the first and fourth switches Q1 and Q4 or the second and third switches Q2 and Q3 are turned on, a discontinuous mode in which the current changes in a discontinuous manner occurs. During the discontinuous-mode period, a polarity of the transformer-applied voltage is inverted and the waveform is such that a positive-voltage pulse and a negative-voltage pulse are each included twice during the switching cycle Ts.

In contrast, in the driving according to the present embodiment shown in FIG. 12, the fourth switch Q4 is turned on during a period of time t0 to t2, beyond a period of time t0 to t1 during which the first switch Q1 is turned on. The third switch Q3 is turned on during a period of time t2 to t4, beyond a period of time t2 to t3 during which the second switch Q2 is turned on. As a result of the full duty ratio driving of the upper arm switches Q3 and Q4 such as this, the occurrence of a discontinuous mode of electrical current is prevented. In addition, the transformer-applied voltage forms a one-pulse waveform in which the positive-voltage pulse and the negative-voltage pulse are each included once during the switching cycle Ts. The one-pulse waveform means that pulses that are as commanded are applied to the transformer.

Figure 13A:
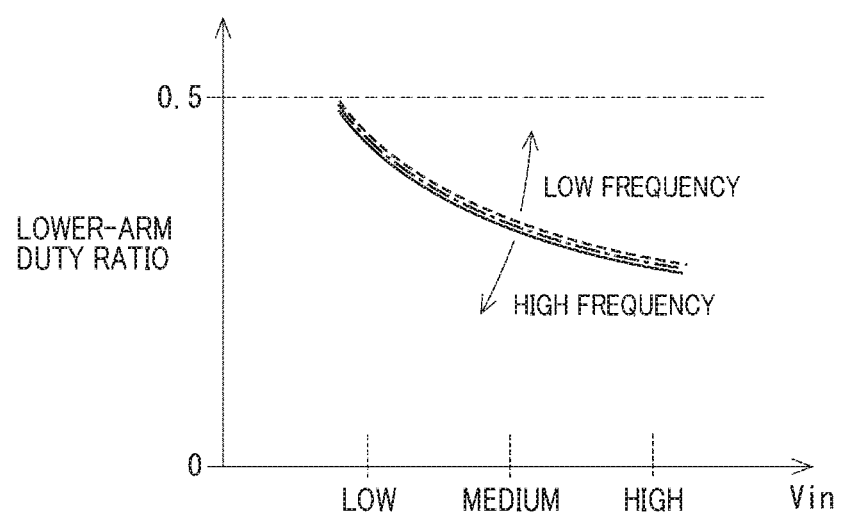
FIG. 13A is an input voltage and duty ratio map according to the first embodiment.
Figure 13B:
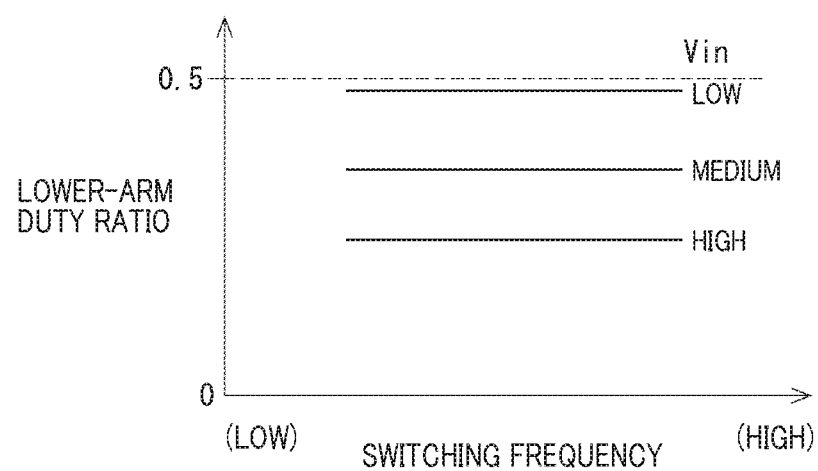
FIG. 13B is a diagram of switching frequency dependency of the duty ratio according to the first embodiment.
Figure 20A:
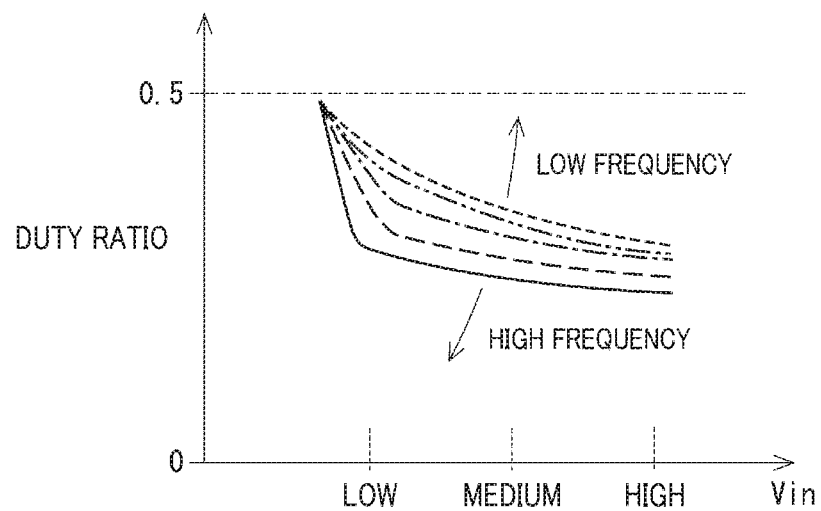
FIG. 20A is the input voltage and duty ratio map in the comparison example.
Figure 20B:
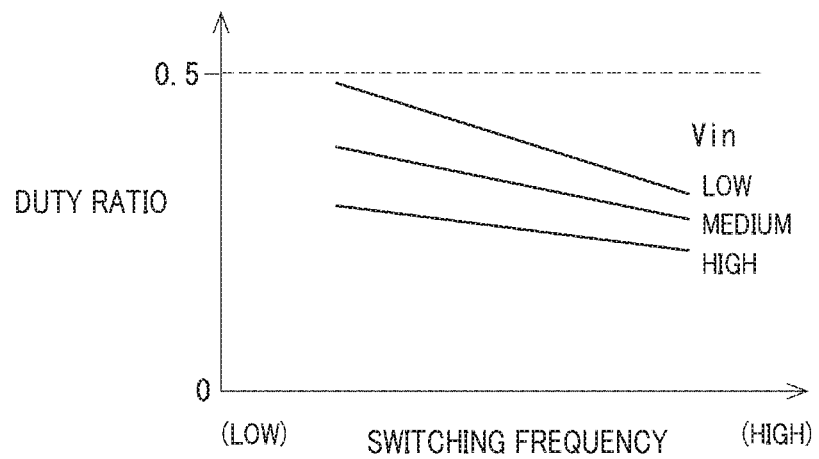
FIG. 20B is a diagram of switching frequency dependency of the duty ratio in the comparison example.

In addition, regarding effects of frequency dependency in the duty ratio calculator 50, refer to FIG. 20A and FIG. 20B of the comparison example, and FIG. 13A and FIG. 13 according to the present embodiment. FIG. 20A and FIG. 13A show maps of the duty ratio that is required for constant electric power to be outputted when the input voltage Vin changes for each switching frequency, determined through simulation. FIG. 20B and FIG. 13B show map converted to a relationship of switching frequency to duty ratio for each level of the input voltage Vin, that is, low, medium, and high. Here, the duty ratio on a vertical axis indicates a value that is used for both the lower-arm duty ratio and the upper-arm duty ratio in the comparison example. According to the present embodiment, the duty ratio on the vertical axis indicates the lower-arm duty ratio.

In the comparison example, at the same input voltage Vin, the duty ratio tends to increase as the frequency decreases, and the duty ratio tends to decrease as the frequency increases. That is, the duty ratio is dependent on the switching frequency. Therefore, in the comparison example, a plurality of maps based on the frequencies are required for feed-forward control of the duty ratio. In addition, when the load C3 is a discharge reactor or the like, characteristics may change due to variations in load capacitance or the like and temperature change, and the resonance frequency may change. In this case as well, effects caused by changes in the characteristics of the load are received during feed-forward control of the duty ratio.

In contrast, in FIG. 13A according to the present embodiment, maps for a plurality of switching frequencies overlap on a single line. Here, in FIG. 13A, the plurality of lines are intentionally slightly shifted to indicate that a plurality of maps are overlapped. In addition, as shown in FIG. 13B, the duty ratio is not dependent on the switching frequency at each input voltage Vin. Because frequency dependency is not present, even if the characteristics of the load C3 changes and the resonance frequency changes, the effects thereof are not received. Therefore, according to the present embodiment, acquisition and adaptation of maps based on the characteristics of the load C3 and the switching frequency are unnecessary. Feed-forward control of the duty ratio can be performed with a single map.

Here, the map in FIG. 13A is acquired through simulation. However, the lower-arm duty ratio calculator 51 may calculate the lower-arm duty ratio using a mathematical expression in which polynomial approximation of a waveform acquired through simulation or experiment is performed. As a result, an optimal duty ratio can be calculated in advance. In addition, the lower-arm duty ratio calculator 51 can also derive the duty ratio that is equivalent to the map in FIG. 13A by a theoretical formula. Next, derivation of the theoretical formula for calculating the duty ratio based on the input voltage Vin will be described.

First, symbols in the expressions will be defined in the following manner.

Vin: input voltage

Vin_min: lower-limit value within the variation range of the input voltage x: required attenuation amount Vt: transformer-applied voltage applied to the transformer 20

Vt_min: minimum value of the transformer-applied voltage

Vc: clamp capacitor voltage that is an inter-electrode voltage of clamp capacitor C2

Figure 14:
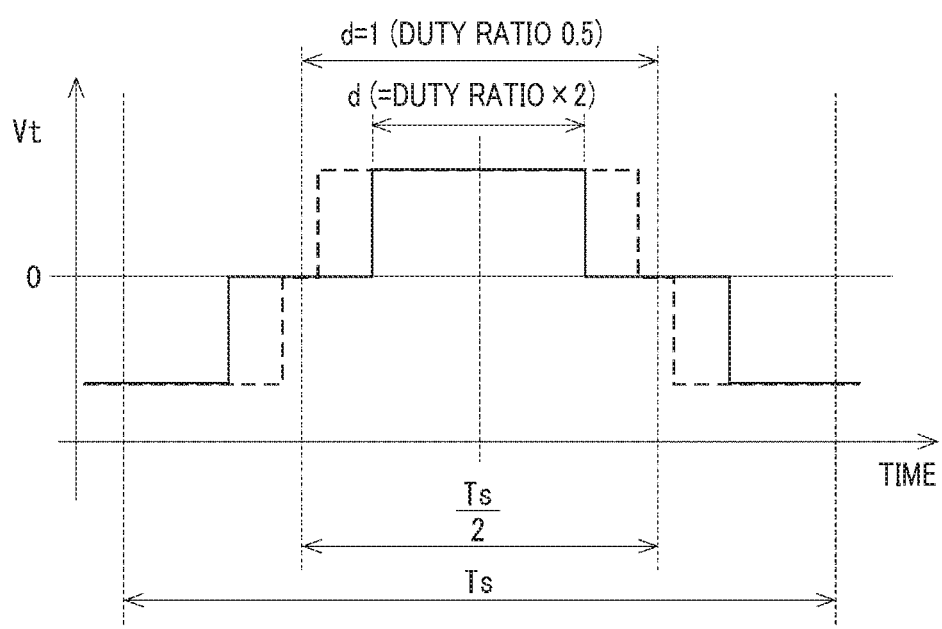
FIG. 14 is a one-pulse waveform diagram used for theoretical expression derivation of the duty ratio.

Vc_min: minimum value of the clamp capacitor voltage d: two-fold value of the duty ratio (d=2×duty ratio)

dmax: maximum value of d within the variation range of the input voltage k: base effective value ratio As indicated on a vertical axis in FIG. 7, the maximum value of the duty ratio at the input voltage lower-limit value Vin_L is indicated as (dmax/2). The required attenuation amount x is a required amount of attenuation of the duty ratio (=d/2) that is required in accompaniment with the increase in the input value Vin from the input voltage lower-limit value Vin_L. In addition, according to the present embodiment, the d value is defined as shown in FIG. 14 based on the transformer-applied voltage Vt forming the one-pulse waveform. That is, when the on-time of the switch is half (2/Ts) of the switching cycle, d=1. In actuality, the d value is set within a range of 0≤d<1.

In the active-clamp circuit, because the transformer-applied voltage Vt is the clamp capacitor voltage Vc, the required attenuation amount x is expressed by expression (1).

$$x = \frac{V_{t\_min}}{V_t} = \frac{V_{c\_min}}{V_c} \quad (1)$$

In addition, because the primary circuit is a step-up converter, a relationship between the input voltage Vin and the clamp capacitor voltage Vc is expressed by expressions (2) and (3).

$$V_c = \frac{1}{1-(d/2)} V_{in} \quad (2)$$

$$V_{c\_min} = \frac{1}{1-(d_{max}/2)} V_{in\_min} \quad (3)$$

When expressions (2) and (3) are substituted into expression (1), the required attenuation amount x is expressed by the input voltage Vin and the d value. When the required attenuation amount x is substituted into expression (4), the d value is calculated. The duty ratio is determined from the d value. As a result, the optimal duty ratio can be calculated from the theoretical expression.

$$d = \frac{2}{\pi} \cdot \arcsin\left(2x \cdot \sin\left(\pi \cdot \frac{d_{max}}{2}\right)\right) \quad (4)$$

Derivation of expression (4) will be additionally described. When Fourier expansion is performed on the one-pulse waveform in FIG. 14 and a fundamental wave component is extracted, expressions (5.1) to (5.3), below, are derived. When expressions (5.1) to (5.3) are arranged, expression (4) is obtained.

$$d = \frac{2}{\pi} \cdot \arcsin\left(\frac{\pi}{4} \cdot a\right) \quad (5.1)$$

$$a = \sqrt{2} \cdot x \cdot k \quad (5.2)$$

$$k = \sqrt{2} \cdot \frac{4}{\pi} \cdot \sin\left(\pi \cdot \frac{d_{max}}{2}\right) \quad (5.3)$$

Effects According to the Present Embodiment (1) In the conventional technology in JP-A-2001-251854, the duty ratio is controlled based on a current value that is fed back. Therefore, as a result of response delay that occurs when the input voltage suddenly changes, output variations and overcurrent may occur. In contrast, the lower-arm duty ratio calculator 51 according to the present embodiment calculates the duty ratio by feed-forward control based on the input voltage Vin. Consequently, output variations and overcurrent caused by sudden changes in the input voltage can be suppressed.

(2) In the resonant inverter that uses the push-pull circuit, the current that is supplied to the first primary coil 21 and the second primary coil 22 are primarily taken from the smoothing capacitor C1. Therefore, an issue arises in that the burden placed on the smoothing capacitor C1 is large and ripple current tends to be large. According to the present embodiment, through use of the active-clamp push-pull circuit that includes the clamp capacitor C2 and the upper arm switches Q3 and Q4, the clamp capacitor C2 supports discharge by the smoothing capacitor C1. Consequently, the burden placed on the smoothing capacitor C1 is reduced. Ripple current can be reduced.

(3) In the driving method of the active-clamp push-pull circuit, when the duty ratio of the upper arm switches Q3 and Q4 are changed so as to track the duty ratio of the lower arm switches Q1 and Q2, a problem arises in that discontinuous mode of the output current occurs. The upper-arm duty ratio calculator 53 according to the present embodiment outputs a fixed value that is equal to or greater than the maximum value of the lower-arm duty ratio within the variation range of the input voltage Vin as the upper-arm duty ratio. Preferably the upper-arm duty ratio is set to the maximum value from which the value equivalent to the dead time DT has been subtracted. As a result, the transformer-applied voltage forms a one-pulse waveform. The occurrence of discontinuous mode of electrical current can be prevented as much as possible.

(4) The power controller 601 according to the present embodiment can control electric power to be constant by controlling the switching frequency by feedback control of electric power. In addition, as a result of the transformer-applied voltage forming a one-pulse waveform in this configuration, frequency dependency in feed-forward control of the duty ratio can be eliminated. Consequently, acquisition and adaptation of maps based on the switching frequencies become unnecessary.

Second Embodiment

Figure 15:
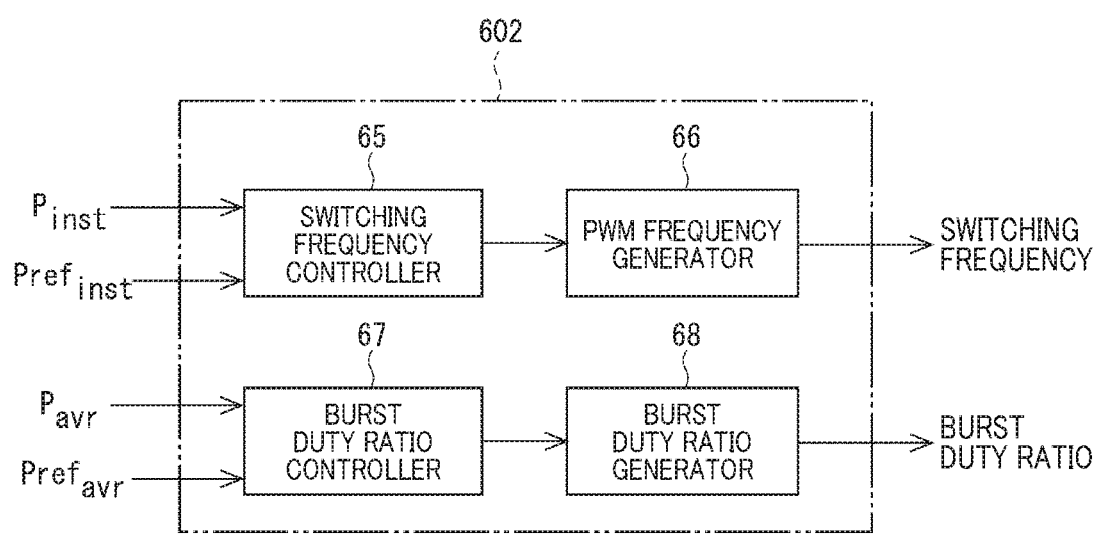
FIG. 15 is a control block diagram of a power controller according to the second embodiment.

The power conversion apparatus according to the second embodiment will be described with reference to FIG. 15 to FIG. 17B. The second embodiment differs from the first embodiment in terms of the configuration of power feedback control. As shown in FIG. 15, the power controller 602 according to the second embodiment further includes a burst duty ratio controller 67 and a burst duty ratio generator 68, in addition to the switching frequency controller 65 and the PWM frequency generator 66 that are included in the power controller 601 according to the first embodiment.

The switching frequency controller 65 and the PWM frequency generator 66 performs feedback control of the switching frequency such that a detection value of instantaneous power Pinst matches target instantaneous power Prefinst, and outputs the switching frequency to the PWM generator 70. The burst duty ratio controller 67 and the burst duty ratio generator 68 performs feedback control of a burst duty ratio such that a detection value of average power Pavr matches target average power Prefavr, and outputs the burst duty ratio to the PWM generator 70. The PWM generator 70 generates the PWM signal that intermittently drives the bridge circuit switches Q1 to Q4 based on the switching frequency and the burst duty ratio generated by the power controller 602.

Figure 16:
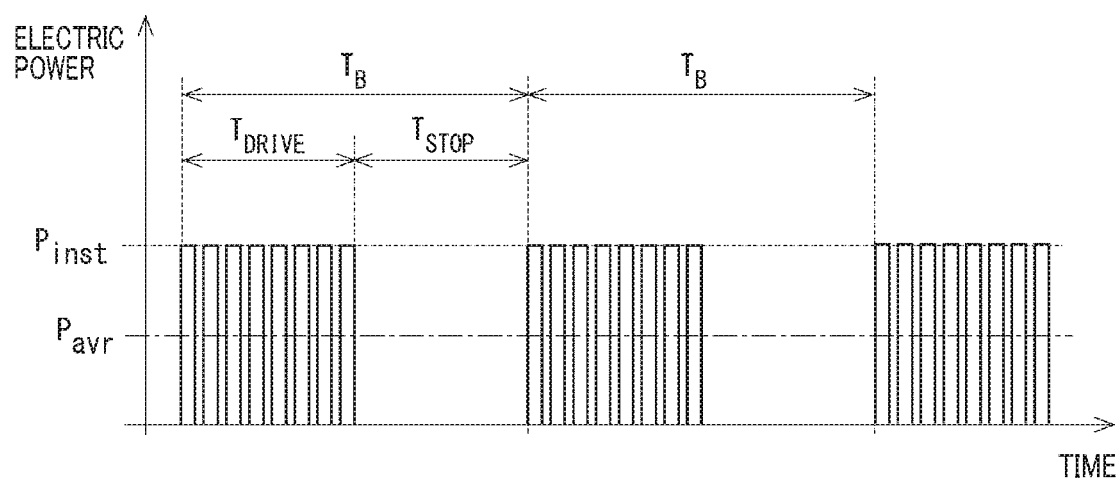
FIG. 16 is a diagram of an intermittent driving pulse signal.

As shown in FIG. 16, the bridge circuit switches Q1 to Q4 are intermittently driven at a predetermined burst cycle TB that includes a drive period TDRIVE and a stop period TSTOP. That is, the bridge circuit switches Q1 to Q4 are operated to on/off based on the commanded duty ratio and switching frequency during the drive period TDRIVE. The bridge circuit switches Q1 to Q4 are all turned off during the stop period TSTOP. The burst duty ratio is a ratio of the drive period TDRIVE relative to the burst cycle TB. For example, when the drive period TDRIVE and the stop period TSTOP are equal, the burst duty ratio is 0.5. Here, burst frequency (Hz) is an inverse of the burst cycle (s). In addition, electric power at output-pulse-on during the drive period TDRIVE is the instantaneous power Pinst. A value obtained by the instantaneous power Pinst being multiplied by the burst duty ratio is the average power Pavr.

Figure 17A:
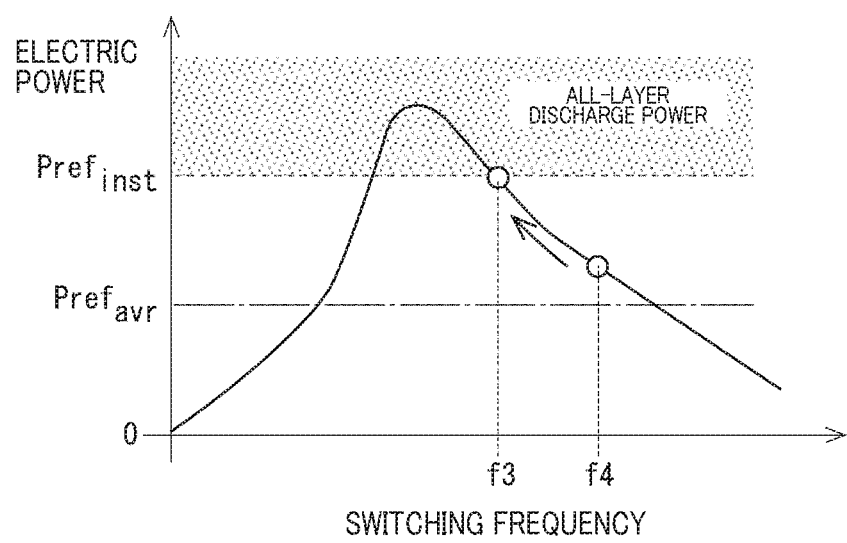
FIG. 17A is a diagram of a relationship between switching frequency and instantaneous power.

All-layer discharge power shown in FIG. 17A refers to instantaneous power that is required to be provided for discharge to be performed at all layers of the discharge reactor C3, that is, between all electrodes 31 and 32. A lower-limit value of the all-layer discharge power is set as the target instantaneous power Prefinst. The power controller 602 first controls the instantaneous power Pinst by changing the switching frequency from f4 to f3 such that the target instantaneous power Prefinst can be obtained on a switching frequency and power characteristics line. As a result, discharge at all layers of the discharge reactor C3 can be actualized.

Figure 17B:
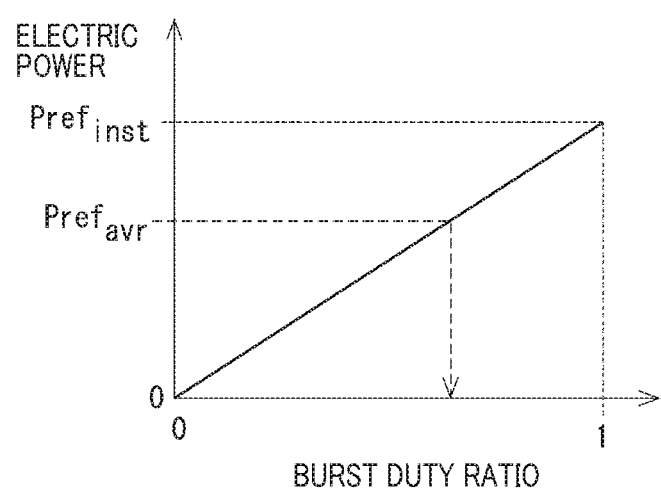
FIG. 17B is a diagram of a relationship between burst duty ratio and average power.

Next, the power controller 602 generates the burst duty ratio that corresponds to the target average power Prefavr based on a relationship between a burst duty ratio and power characteristics line as shown in FIG. 17B. In other words, proportion of the target average power Prefavr relative to the target instantaneous power Prefinst is generated as the burst duty ratio. In this manner, according to the second embodiment, as a result of both the switching frequency and the burst duty ratio being controlled, the average power Pavr can be controlled while efficient discharge at all layers is maintained. In addition, in a manner similar to that according to the first embodiment, the occurrence of discontinuous mode of the output current can be prevented. Frequency dependency in feed-forward control of the lower-arm duty ratio can be reduced.

Other Embodiments (a) The power controller 602 according to the second embodiment controls the average power Pavr by controlling the burst duty ratio upon controlling the instantaneous power Pinst by controlling the switching frequency. In this regard, an aspect in which the switching frequency is, for example, fixed near the resonance frequency of the output current and feedback control of only the average power Pavr is performed through control of the burst duty ratio can be considered. The power controller according to this aspect is merely required to be configured to include only the burst duty ratio controller 67 and the burst duty ratio generator 68. According to this aspect, frequency dependency in feed-forward control of the duty ratio does not become an issue in the first place. Effects similar to those according to the above-described embodiment are achieved regarding prevention of the occurrence of a discontinuous mode of electrical current.

(b) The capacitive load C3 that is connected to the secondary coil 26 of the transformer 20 is not limited to the discharge reactor that is used in the ozone generation apparatus 30 and may be another load. In addition, an inductor or the like for adjusting the resonance frequency of the load C3 may be connected to the secondary circuit.

(c) For example, when strict control of the output power is not required due to characteristics of the load C3, the switch controller may not perform feedback control of the electric power P. The effects (1) to (3) according to the above-described embodiments can be achieved by at least only the feed-forward control of the duty ratio based on the input voltage Vin being performed.

The present disclosure is not limited in any way to the above-described embodiments. Various aspects are possible without departing from the spirit of the present disclosure.

The present disclosure is described based on the embodiments. However, the present disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power conversion apparatus comprising:
a smoothing capacitor that is connected between a high-potential input terminal and a low-potential input terminal to which input voltage of a direct-current power supply is applied;
a first primary coil and a second primary coil that configure a primary side of a transformer, one of ends of the first primary coil and one of ends of the second primary coil being connected to a shared center tap that is connected to the high-potential input terminal;
a secondary coil that configures a secondary side of the transformer, the secondary coil being connected to a load;
a first switch and a second switch that configure a lower arm of a bridge circuit and are alternately operated at a predetermined switching cycle,
the first switch having a high-potential side terminal and a low-potential side terminal, the high-potential side terminal being connected to a switch-side end portion that is an end portion of the first primary coil on a side opposite to the center tap, the low-potential side terminal being connected to the low-potential input terminal, and
the second switch having a high-potential side terminal and a low-potential side terminal, the high-potential side terminal being connected to a switch-side end portion that is an end portion of the first secondary coil on a side opposite to the center tap, the low-potential side terminal being connected to the low-potential input terminal;
a third switch and a fourth switch that configure an upper arm of the bridge circuit and are alternately operated at the switching cycle,
the third switch having terminals, one of the terminals being connected to the switch-side end portion of the first primary coil, and
the fourth switch having terminals, one of the terminals being connected to the switch-side end portion of the second primary coil;
a clamp capacitor that is connected between the other of the terminals of the third switch and the low-potential input terminal and between the other of the terminals of the fourth switch and the low-potential input terminal; and
a switch controller that calculates a duty ratio that is a ratio of an on-time of each of bridge circuit switches, including the first switch, the second switch, the third switch, and the fourth switch, relative to the switching cycle, and controls operation of the bridge circuit switches, such that at least the fourth switch is turned on during an on-period of the first switch and at least the third switch is turned on during an on-period of the second switch, wherein the switch controller includes
a lower-arm duty ratio calculator that calculates a lower-arm duty ratio that is a duty ratio of each of the first switch and the second switch using a map or a mathematical expression by feed-forward control based on the input voltage,
an upper-arm duty ratio calculator that outputs a fixed value that is equal to or greater than a maximum value of the lower-arm duty ratio within a variation range of the input voltage as an upper-arm duty ratio that is a duty ratio of each of the third switch and the fourth switch, and
a pulse width modulation generator that generates a pulse width modulation signal based on output from the lower-arm duty ratio calculator and output from the upper-arm duty ratio calculator, and outputs the pulse width modulation signal to the bridge circuit switches.

2. The power conversion apparatus according to claim 1, wherein:
the switch controller prohibits the first switch and the second switch from being simultaneously turned on and the third switch and the fourth switch from being simultaneously turned on.

3. The power conversion apparatus according to claim 2, wherein:
the upper-arm duty ratio is set to a maximum value that is obtained by a value that is equivalent to dead time being subtracted from 0.5, the dead time being an amount of time ensured between the on-period of the third switch and the on-period of the fourth switch.

4. The power conversion apparatus according to claim 3, wherein:
the lower-arm duty ratio calculator is configured to:
(i) calculate a required attenuation amount from the input voltage using expression (1), expression (2), and expression (3), below, $$x = \frac{V_{t\_min}}{V_t} = \frac{V_{c\_min}}{V_c} \quad (1)$$

$$V_c = \frac{1}{1-(d/2)} V_{in} \quad (2)$$

$$V_{c\_min} = \frac{1}{1-(d_{max}/2)} V_{in\_min} \quad (3)$$

where
Vin is the input voltage,
Vin_min is a lower-limit value within the variation range of the input voltage,
x is a required attenuation amount that is an amount of attenuation of the duty ratio that is required in accompaniment with increase in the input voltage from the lower-limit value,
Vt is a transformer-applied voltage that is applied to the transformer,
Vt_min is a minimum value of the transformer-applied voltage,
Vc is a clamp capacitor voltage that is an inter-electrode voltage of the clamp capacitor,
Vc_min is a minimum value of the clamp capacitor voltage, d is a two-fold value of the duty ratio, and
dmax is a maximum value of the two-fold value of the duty ratio within the variation range of the input voltage;
(ii) calculate the d value from expression (4), below; and $$d = \frac{2}{\pi} \cdot \arcsin\left(2x \cdot \sin\left(\pi \cdot \frac{d_{max}}{2}\right)\right) \quad (4)$$

(iii) calculate the lower-arm duty ratio based on the calculated d value.

5. The power conversion apparatus according to claim 4, wherein:
the switch controller further includes
a power controller that performs feedback control of input power on the primary side of the transformer or output power on the secondary side to target power; and
the pulse width modulation generator generates the pulse width modulation signal also based on output from the power controller.

6. The power conversion apparatus according to claim 5, wherein:
the power controller controls output electric power by controlling switching frequency of each of the bridge circuit switches.

7. The power conversion apparatus according to claim 6, wherein:
the switch controller intermittently drives the bridge circuit switches at a predetermined burst cycle that includes a drive period and a stop period; and
the power controller controls electric power by controlling a burst duty ratio that is a ratio of the drive period relative to the burst cycle.

8. The power conversion apparatus according to claim 7, wherein:
the load is a discharge reactor that is used in an ozone generation apparatus.

9. The power conversion apparatus according to claim 1, wherein:
the upper-arm duty ratio is set to a maximum value that is obtained by a value that is equivalent to dead time being subtracted from 0.5, the dead time being an amount of time ensured between the on-period of the third switch and the on-period of the fourth switch.

10. The power conversion apparatus according to claim 1, wherein:
the lower-arm duty ratio calculator is configured to:
(i) calculate a required attenuation amount from the input voltage using expression (1), expression (2), and expression (3), below, $$x = \frac{V_{t\_min}}{V_t} = \frac{V_{c\_min}}{V_c} \quad (1)$$

-continued $$V_c = \frac{1}{1-(d/2)} V_{in} \quad (2)$$

$$V_{c\_min} = \frac{1}{1-(d_{max}/2)} V_{in\_min} \quad (3)$$

where
Vin is the input voltage,
Vin_min is a lower-limit value within the variation range of the input voltage,
x is a required attenuation amount that is an amount of attenuation of the duty ratio that is required in accompaniment with increase in the input voltage from the lower-limit value,
Vt is a transformer-applied voltage that is applied to the transformer,
Vt_min is a minimum value of the transformer-applied voltage,
Vc is a clamp capacitor voltage that is an inter-electrode voltage of the clamp capacitor,
Vc_min is a minimum value of the clamp capacitor voltage,
d is a two-fold value of the duty ratio, and
dmax is a maximum value of the two-fold value of the duty ratio within the variation range of the input voltage;
(ii) calculate the d value from expression (4), below; and $$d = \frac{2}{\pi} \cdot \arcsin\left(2x \cdot \sin\left(\pi \cdot \frac{d_{max}}{2}\right)\right) \quad (4)$$

(iii) calculate the lower-arm duty ratio based on the calculated d value.

11. The power conversion apparatus according to claim 1, wherein:
the switch controller further includes
a power controller that performs feedback control of input power on the primary side of the transformer or output power on the secondary side to target power; and
the pulse width modulation generator generates the pulse width modulation signal also based on output from the power controller.

12. The power conversion apparatus according to claim 11, wherein:
the switch controller intermittently drives the bridge circuit switches at a predetermined burst cycle that includes a drive period and a stop period; and
the power controller controls electric power by controlling a burst duty ratio that is a ratio of the drive period relative to the burst cycle.

13. The power conversion apparatus according to claim 1, wherein:
the load is a discharge reactor that is used in an ozone generation apparatus.

* * * * *